(12) United States Patent
Ammari et al.

(10) Patent No.: US 12,153,829 B2
(45) Date of Patent: Nov. 26, 2024

(54) INTERACTIVE MECHANISM TO COMMUNICATE WITH TOOLS INSIDE COMPUTATIONAL DEVICES

(71) Applicant: Samsung Electronics Co., Ltd., Suwon-si (KR)

(72) Inventors: Ramzi Ammari, Santa Clara, CA (US); Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/692,165

(22) Filed: Mar. 10, 2022

(65) Prior Publication Data

US 2023/0229353 A1    Jul. 20, 2023

Related U.S. Application Data

(60) Provisional application No. 63/299,909, filed on Jan. 14, 2022.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 9/544; G06F 9/45512; G06F 9/44505; G06F 9/3001; G06F 9/3004; G06F 9/30079; G06F 9/3867
See application file for complete search history.

(56) References Cited

U.S. PATENT DOCUMENTS

| | | |
|---|---|---|
| 7,673,180 B1 | 3/2010 | Chen et al. |
| 8,055,816 B2 | 11/2011 | Asnaashari et al. |
| 8,209,704 B1 | 6/2012 | McCann et al. |
| 8,261,361 B2 | 9/2012 | Liu et al. |
| 8,271,557 B1 | 9/2012 | Lysaght et al. |
| 8,898,542 B2 | 11/2014 | Leggette et al. |
| 9,122,794 B2 | 9/2015 | Smiljanic et al. |
| 9,430,412 B2 | 8/2016 | Huang |
| 9,542,122 B2 | 1/2017 | Bohn et al. |
| 9,542,224 B2 | 1/2017 | Klee et al. |
| 9,632,848 B1 | 4/2017 | Oldcorn et al. |
| 9,690,615 B2 | 6/2017 | Dong et al. |

(Continued)

FOREIGN PATENT DOCUMENTS

| | | |
|---|---|---|
| CA | 1311850 C | 12/1992 |
| CN | 109656473 A | 4/2019 |

(Continued)

OTHER PUBLICATIONS

Vaught, Andy, "Introduction to Named Pipes," Sep. 1997, https://www.linuxjournal.com/article/2156.*

(Continued)

*Primary Examiner* — Tracy A Warren
(74) *Attorney, Agent, or Firm* — Renaissance IP Law Group LLP

(57) ABSTRACT

A system is disclosed. A computational storage unit may include a memory and a tool. A command parser may receive a command and start the tool on the computational storage unit. A pipe may be established between a file in the memory and an input of the tool.

20 Claims, 16 Drawing Sheets

(56) References Cited

U.S. PATENT DOCUMENTS

| | | |
|---|---|---|
| 9,703,678 B2 | 7/2017 | Stall et al. |
| 10,157,143 B2 | 12/2018 | Xu et al. |
| 10,187,479 B2 | 1/2019 | Willmann |
| 10,261,912 B2 | 4/2019 | Coppola et al. |
| 10,372,376 B2 | 8/2019 | Singh et al. |
| 10,372,648 B2 | 8/2019 | Qiu |
| 10,394,746 B2 | 8/2019 | Kachare et al. |
| 10,466,903 B2 | 11/2019 | Benisty et al. |
| 10,534,546 B2 | 1/2020 | Benisty et al. |
| 10,565,142 B2 | 2/2020 | Jin et al. |
| 10,592,380 B2 | 3/2020 | Borello et al. |
| 10,642,496 B2 | 5/2020 | Benisty et al. |
| 10,678,432 B1 | 6/2020 | Dreier et al. |
| 10,678,677 B1 | 6/2020 | Kuris et al. |
| 10,705,952 B2 | 7/2020 | Kanaujia et al. |
| 10,705,974 B2 | 7/2020 | Qiu et al. |
| 10,740,217 B1 | 8/2020 | Stupachenko et al. |
| 10,756,816 B1 | 8/2020 | Dreier |
| 10,769,050 B2 | 9/2020 | Peck et al. |
| 10,783,051 B2 | 9/2020 | Srinivasan et al. |
| 10,798,224 B2 | 10/2020 | Masputra et al. |
| 10,877,911 B1 | 12/2020 | Khan et al. |
| 10,901,624 B1 | 1/2021 | Benisty |
| 10,908,998 B2 | 2/2021 | Ding et al. |
| 10,915,381 B2 | 2/2021 | Costa et al. |
| 10,915,426 B2 | 2/2021 | Douglas |
| 10,949,321 B1 | 3/2021 | Volpe et al. |
| 11,074,114 B1 | 7/2021 | Kostyushko et al. |
| 11,086,800 B2 | 8/2021 | Andrus et al. |
| 11,138,134 B2 | 10/2021 | Dracea et al. |
| 11,403,044 B2 | 8/2022 | Khan et al. |
| 11,409,465 B2 | 8/2022 | Nimmagadda et al. |
| 11,442,733 B2 | 9/2022 | Jones |
| 11,449,240 B1 | 9/2022 | Jadon et al. |
| 11,467,987 B1 | 10/2022 | Jones |
| 11,487,471 B2 | 11/2022 | Greer et al. |
| 11,507,298 B2 | 11/2022 | Yang et al. |
| 11,507,301 B2 | 11/2022 | Norman |
| 11,561,909 B2 | 1/2023 | Hahn et al. |
| 2006/0262124 A1 | 11/2006 | Stauffer et al. |
| 2010/0005482 A1 | 1/2010 | Mukker et al. |
| 2012/0311117 A1 | 12/2012 | Fulop et al. |
| 2012/0311290 A1 | 12/2012 | White |
| 2014/0033189 A1 | 1/2014 | Buswell |
| 2014/0351831 A1 | 11/2014 | Adda et al. |
| 2015/0261720 A1 | 9/2015 | Kagan et al. |
| 2016/0378545 A1 | 12/2016 | Ho |
| 2018/0285252 A1 | 10/2018 | Kwon et al. |
| 2019/0005234 A1 | 1/2019 | Klonowski |
| 2019/0205190 A1 | 7/2019 | Hebbal et al. |
| 2020/0034073 A1 | 1/2020 | Saha et al. |
| 2020/0127836 A1 | 4/2020 | Pappachan et al. |
| 2020/0201558 A1 | 6/2020 | Cho et al. |
| 2020/0293354 A1 | 9/2020 | Song et al. |
| 2020/0301898 A1 | 9/2020 | Samynathan et al. |
| 2020/0341933 A1 | 10/2020 | Kachare et al. |
| 2020/0343974 A1 | 10/2020 | Dreier |
| 2020/0379828 A1 | 12/2020 | Thorpe et al. |
| 2021/0011855 A1 | 1/2021 | Charan et al. |
| 2021/0019218 A1 | 1/2021 | Zhu et al. |
| 2021/0049036 A1 | 2/2021 | Poess et al. |
| 2021/0073116 A1 | 3/2021 | Rogers et al. |
| 2021/0117246 A1 | 4/2021 | Lal et al. |
| 2021/0150770 A1 | 5/2021 | Appu et al. |
| 2021/0208997 A1 | 7/2021 | Immonen |
| 2021/0255793 A1 | 8/2021 | Jaiyeoba et al. |
| 2021/0311641 A1 | 10/2021 | Prakashaiah et al. |
| 2022/0276803 A1 | 9/2022 | Yang et al. |
| 2022/0300165 A1 | 9/2022 | Kerr et al. |
| 2022/0300207 A1 | 9/2022 | Tsuji et al. |
| 2022/0318160 A1* | 10/2022 | Jones ................ G06F 13/4282 |
| 2022/0350604 A1 | 11/2022 | Jones |
| 2022/0365709 A1 | 11/2022 | Raghunath et al. |

FOREIGN PATENT DOCUMENTS

| | | |
|---|---|---|
| CN | 111427808 A | 7/2020 |
| CN | 112579254 A | 3/2021 |
| CN | 112905472 A | 6/2021 |
| CN | 113342590 A | 9/2021 |
| WO | 2015067983 A1 | 5/2015 |
| WO | 2018175059 A1 | 9/2018 |

OTHER PUBLICATIONS

"happily embedded," "RTOS Concepts—Kernel Objects." 2015, https://happilyembedded.wordpress.com/2015/10/23/rtos-conecpts-kernel-objects/.*

Do, Jaeyoung et al., "Cost-Effective, Energy-Efficient, and Scalable Storage Computing for Large-scale AI Applications", ACM Transactions on Storage, Association for Computing Machinery, vol. 16, No. 4, Article 21, 2020, pp. 1-37.

European Extended Search Report for Application No. 22185404.5, dated Nov. 30, 2022.

Li, Hongwei et al., "Research of 'Stub' Remote Debugging Technique", 2009 4th International Conference on Computer Science & Education, 2009, pp. 990-994.

Lin, Tsung-Han et al., "Hardware-Assisted Reliability Enhancement for Embedded Multi-Core Virtualization Design", 2011 14th IEEE International Symposium on Object/Component/Service-Oriented Real-Time Distributed Computing, 2011, pp. 241-249.

Malone, Kim et al., "NVMe Computation Storage Standardizing Offload of Computation via NVMe", Storage Developer Conference, Virtual Conference, 2021, 24 pages.

Office Action for U.S. Appl. No. 17/482,412, dated Dec. 9, 2022.

Oh, Myonghoon et al., "Mitigating Journaling Overhead via Atomic Write," 2018 International Conference on Information and Communication Technology Convergence (ICTC), IEEE, pp. 539-542.

Torabzadehkashi, Mahdi et al.: "Computational Storage: An Efficient and Scalable Platform for Big Data and HPC Applications", Journal of Big Data, vol. 6, No. 1, 2019, 29 pages.

Xuan, Chaoting et al., "Toward Revealing Kernel Malware Behavior in Virtual Execution Environments", International Workshop on Recent Advances in Intrusion Detection. Springer, Berlin, Heidelberg, 2009, 20 pages.

Yang, Ziye et al., "SPDK vhost-NVMe: Accelerating I/Os in Virtual Machines on NVMe SSDs via User Space vhost Target", 2018 IEEE 8th International Symposium on Cloud and Service Computing (SC2), 2018, pp. 67-76.

Akin, T. Allen et al., "A Prototype for an Advanced Command Language," ACM-SE 16: Proceedings of the 16th Annual Southeast Regional Conference, Apr. 1978, pp. 96-102.

Ellis, John R., "A Lisp Shell," Computer Science Department, Yale University, 1980, pp. 24-34.

European Extended Search Report for Application No. 23150871.4, dated Apr. 12, 2023.

Kernighan, Brian W et al., "Software Tools," Bell Laboratories, 1976, 6 pages.

Lin, Jim-Min et al., "Integrating Existing Software Packages Using the Virtual Machine Technique", Journal of Systems and Software, vol. 18, Issue 3, Jul. 1992, pp. 207-218.

Meyer, Veronika et al., "The UNIX® Timesharing Operating System," Computer Physics Communications, vol. 50, Issues 1-2, Jul. 1988, pp. 51-57.

Morales-Velazquez, Luis et al., "Open-Architecture System Based on a Reconfigurable Hardware-Software Multi-Agent Platform for CNC Machines," Journal of Systems Architecture, vol. 56, Issue 9, Sep. 2010, pp. 407-418.

Smith, Terence R et al., "Virtual Structures—A Technique for Supporting Scientific Database Applications," Entity—Relationship Approach—ER '94 Business Modelling and Re-Engineering, ER 1994, Lecture Notes in Computer Science, vol. 881, 1994, 22 pages.

Thomas, Mark A., "I/O Redirection and Pipes," Dec. 2019, retrieved from https://homepages.uc.edu/~thomam/Intro_Unix_Text/IO_Redir_Pipes.html Mar. 2023, 7 pages.

(56) References Cited

OTHER PUBLICATIONS

Thompson, T. J., "A Utilitarian Approach to CAD," 19th Design Automation Conference, IEEE, 1982, pp. 23-29.
European Extended Search Report for Application No. 22209270.2, dated Mar. 23, 2023.
Final Office Action for U.S. Appl. No. 17/482,412, dated Apr. 7, 2023.
Notice of Allowance for U.S. Appl. No. 17/482,412, dated Jun. 28, 2023.
Office Action for U.S. Appl. No. 17/583,179, dated Jun. 8, 2023.
Corrected Notice of Allowability for U.S. Appl. No. 17/482,412, dated Nov. 13, 2023.
Notice of Allowance for U.S. Appl. No. 17/482,412, dated Dec. 6, 2023.
Final Office Action for U.S. Appl. No. 17/583,179, mailed Feb. 26, 2024.
Office Action for U.S. Appl. No. 17/583,179, mailed Jul. 16, 2024.

\* cited by examiner

```
1  ##include <stdio.h>
2  ##include <stdlib.h>
3
4
5  void fuction_3()
6  {
7       printf("going back to main\n");
8  }
9
10 void function_2()
11 {
12      function_3();
13 }
14
15 void function_1()
16 {
17      function_2();
18
19 }
20
21 int main()
22 {
23
24      printf("hello world\n");
25
26      function_1();
27      int x = 5;
28      int y = 10;
29
30      printf("done running – exiting \n");
31      return 0;
32 }
```

FIG. 7A

| 710 | 715 |
|---|---|
| nvme debug /dev/nvme0n1 -b "/root/slot_0/a.out" | |
| nvme debug /dev/nvme0n1 -a "break 7" | (gdb) Breakpoint 1 at 0x72c: file: prog_0.c, line 7. |
| nvme debug /dev/nvme0n1 -a "run" | (gdb)<br>Starting program: /root/slot_0/a.out<br>Breakpoint 1, function_3 () at prog_0.c:7<br>7 printf("going back to main\n"); |
| nvme debug /dev/nvme0n1 -a "bt" | 1 0x0000000055555750 in function_2 () at prog_0.c:12<br>2 0x0000000055555768 in function_1 () at prog_0.c:17<br>3 0x000000005555578c in main () at prog_0.c:26<br>(gdb) Breakpoint 2 at 0x5555557a0: file prog_0.c, line 30. |
| nvme debug /dev/nvme0n1 -a "break 30" | (gdb) Continuing. |
| nvme debug /dev/nvme0n1 -a "continue" | Breakpoint 2, main () at prog_0.c:30<br>30 printf("done running – executin \n"); |
| nvme debug /dev/nvme0n1 -a "print x" | (gdb) $1 = 5 |
| nvme debug /dev/nvme0n1 -a "print y" | (gdb) $2 = 10 |
| nvme debug /dev/nvme0n1 -a "q" | (gdb) A debugging session is active.<br>Inferior 1 [process 27245] will be killed.<br>Quit anyway? (y or n) [answered Y; input not from terminal] |

FIG. 7B

INTERACTIVE MECHANISM TO COMMUNICATE WITH TOOLS INSIDE COMPUTATIONAL DEVICES

RELATED APPLICATION DATA

This application claims the benefit of U.S. Provisional Patent Application Ser. No. 63/299,909, filed Jan. 14, 2022, which is incorporated by reference herein for all purposes.

FIELD

The disclosure relates generally to computational devices, and more particularly to a mechanism to enable interactive communication with tools run on computational devices.

BACKGROUND

Computational devices tend to be associated with storage devices. In some situations, the computational devices may be accessed through the storage device. That is, the storage device may be the recipient of a request intended for the computational device, and may redirect the request to the computational device.

A need remains to enable interactive communications with a computational device.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 7A shows an example program that may be run on the computational storage unit of FIG. 1, according to embodiments of the disclosure.

FIG. 7B shows example commands that may be sent to the computational storage unit of FIG. 1 for the program shown in FIG. 7A and their corresponding outputs, according to embodiments of the disclosure.

SUMMARY

Figure 1:
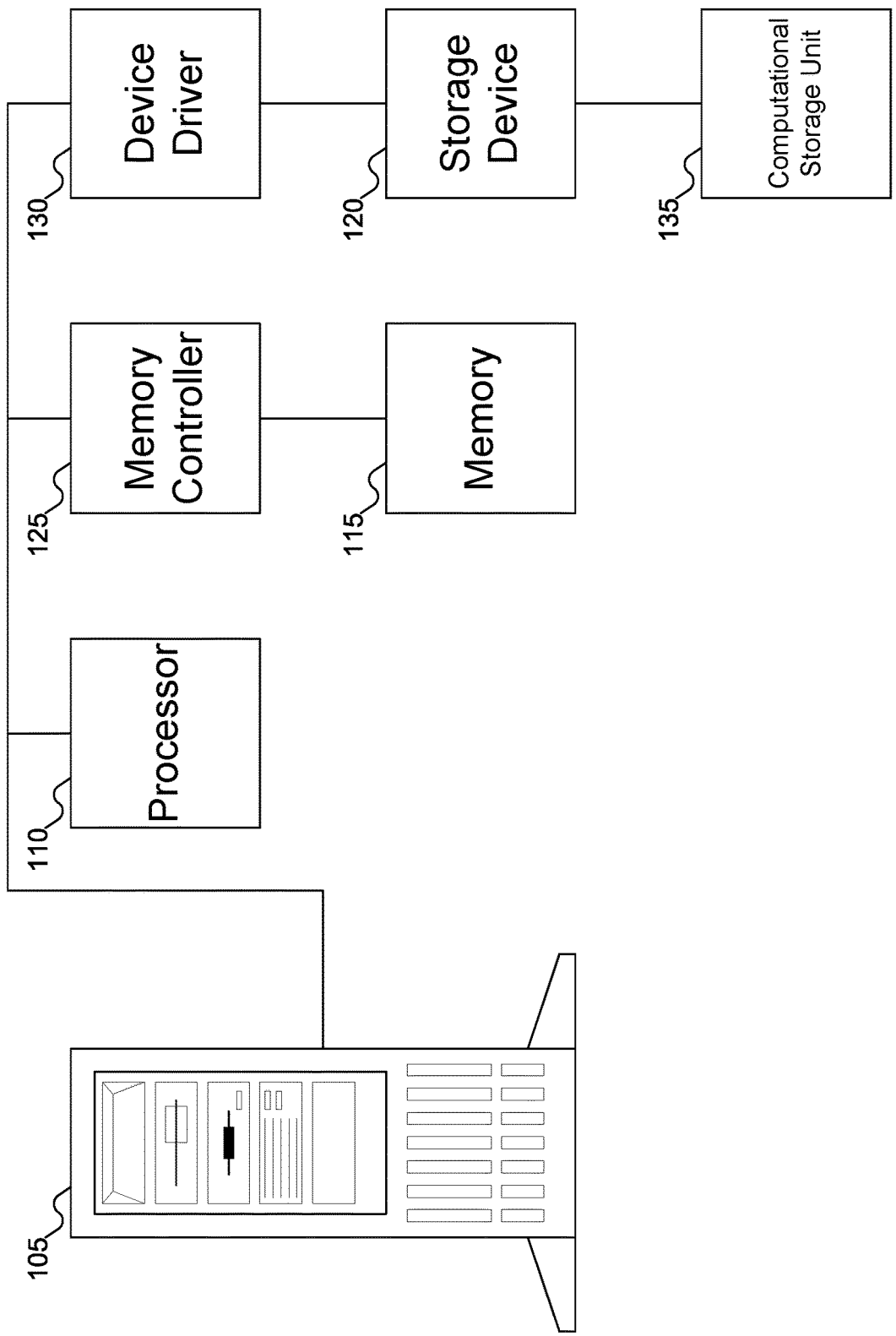
FIG. 1 shows a machine configured to support interactive communication with a computational storage unit, according to embodiments of the disclosure.

Embodiments of the disclosure may include a system. The system may include a storage device to store data and a load module to read the data from the storage device. A scheduler may receive an input/output (I/O) request and deliver the I/O request to the load module based on a size of the I/O request.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Computational devices may take the form of a central processing unit (CPU), a graphics processing unit (GPU), a general purpose GPU (GPGPU), a neural processing unit (NPU), a field programmable gate array (FPGA), or an application-specific integrated circuit (ASIC), among other possibilities. A computational device may be associated with one or more storage devices, which may store the data to be processed using the computational device. It may happen that a command for the computational device may be sent to the storage device, which may then forward the command to the computational device.

Storage devices tend to receive requests that are generally unrelated to each other. For example, a write request received at one point in time typically is unrelated to a read request received next. But with a computational device, that assumption might not be true. For example, for a computational device running a calculator software to execute the command "2+3", the computational device may receive three pieces of data—the operation ("+") and the two operands ("2" and "3")—to perform the calculation. If these data are received sequentially, it may be important to indicate the relationship between data, so that the computational device knows what to do with the data. But there might not be a way for a command to say that one piece of data is related to another piece of data to be processed by the computational device.

Embodiments of the disclosure address these problems by permitting interactive communication with the computational device. A named pipe may be established between a file or location in memory in the computational device and an input to the software running on the computational device. When data is stored the file in the memory, the data may be provided as input to a particular software running on the computational device.

Embodiments of the disclosure may also direct output from the computational device to a log file. A process running on a host machine may periodically interrogate the log file for new data, and may provide that data to the host. In this manner, the host may receive the results of commands in a real-time (or near real-time) manner.

Embodiments of the disclosure may also return output as a result of the commands received at the computational device. Normally, requests sent to a storage device return whether the request succeeded or failed, but no other data (for example, data read from the storage device as a result of a read request is placed in a buffer that may be separately accessed). The computational device may leverage the data structure used to return results from commands to return output, rather than just an indicator of success or failure.

FIG. 1 shows a machine configured to support interactive communication with a computational storage unit, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may each support any desired protocol or protocols, including, for example, the Non-Volatile Memory Express (NVMe) protocol. Different storage devices 120 may support different protocols and/or interfaces.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. Further, different types of storage devices may be mixed. For example, one storage device 120 might be a hard disk drive, and another storage device 120 might be an SSD.

Machine 105 may also include computational storage unit 135 (which may also be called a computational device or a computational storage, either with or without storage device 120). Computational storage unit 135 may be a form of local processing "nearer" to storage device 120 than processor 110, and which may perform processing to reduce the load on processor 110. Computational storage unit 135 is discussed further with reference to FIGS. 3A-3D below.

Figure 2:
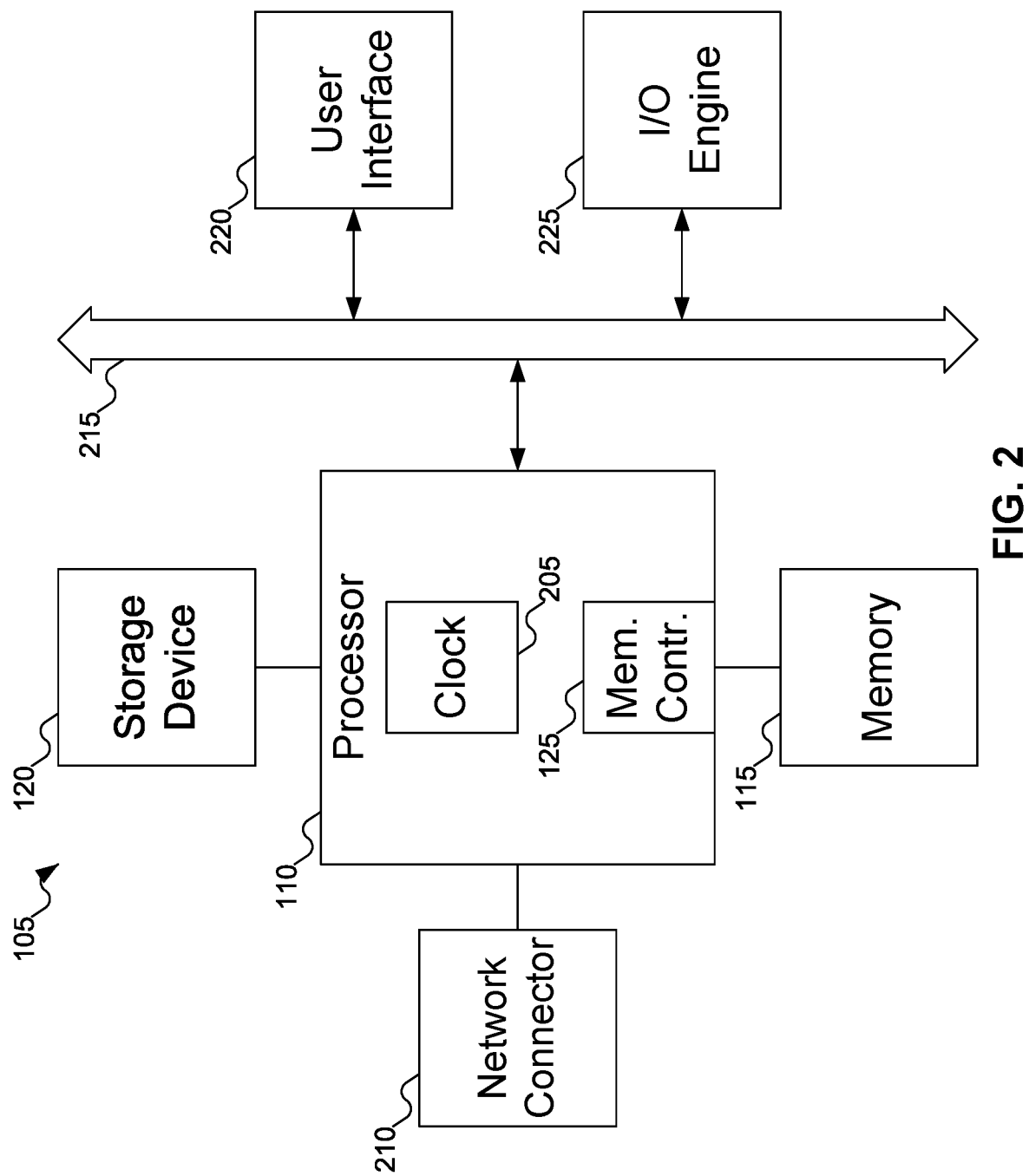
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
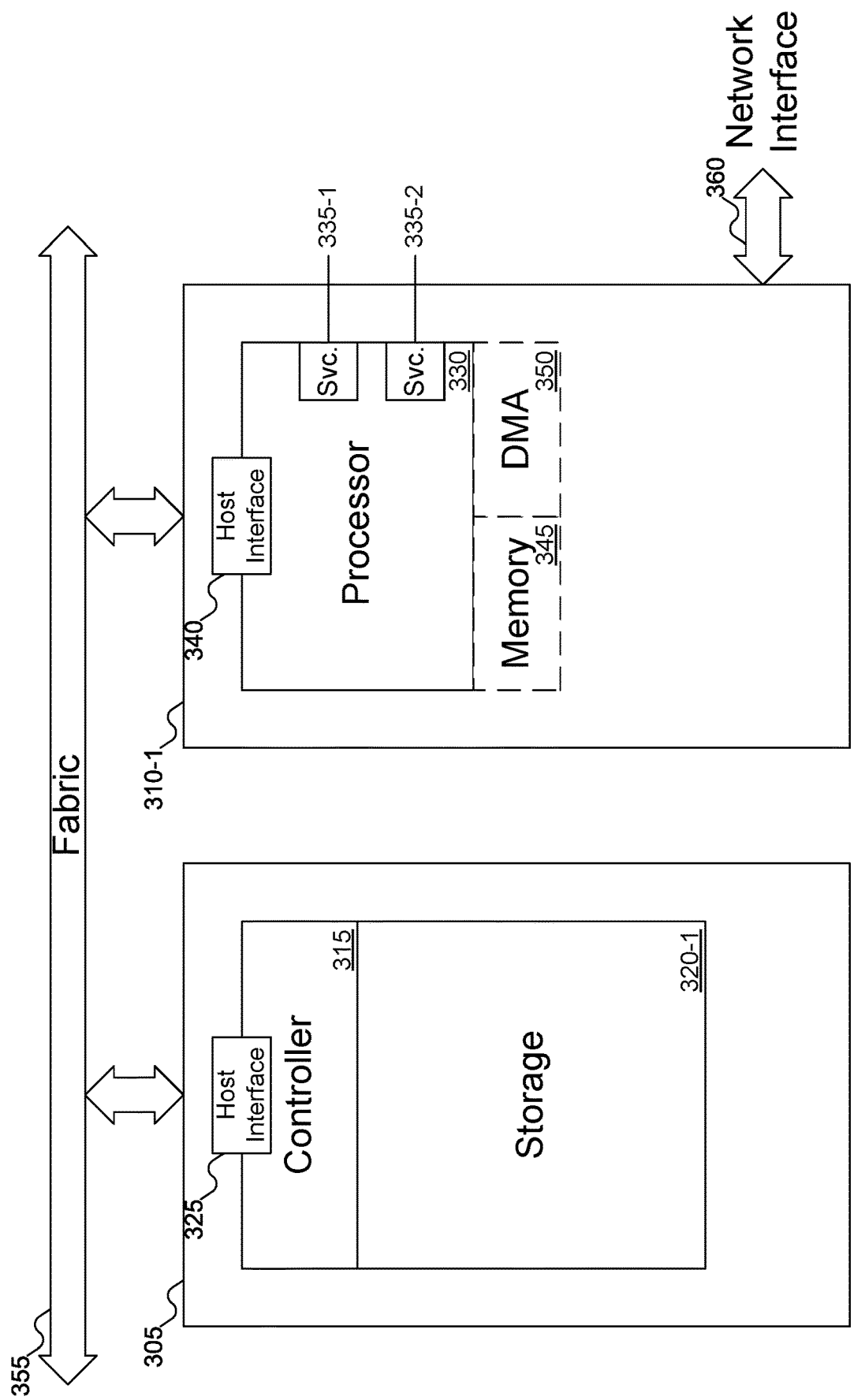
FIG. 3A shows a first example implementation of the computational storage unit of FIG. 1, according to embodiments of the disclosure.

FIGS. 3A-3D shows example implementations of computational storage unit 135 of FIG. 1, according to embodiments of the disclosure. In FIG. 3A, storage device 305 and computational device 310-1 are shown. Storage device 305 may include controller 315 and storage 320-1, and may be reachable across a host protocol interface, such as host interface 325. Host interface 325 may be used both for management of storage device 305 and to control I/O of storage device 305. An example of host interface 325 may include queue pairs for submission and completion, but other host interfaces 325 are also possible, using any native host protocol supported by storage device 305.

Computational device 310-1 may be paired with storage device 305. Computational device 310-1 may include any number (one or more) processors 330, each of which may offer one or more services 335-1 and 335-2. To be clearer, each processor 330 may offer any number (one or more) services 335-1 and 335-2 (although embodiments of the disclosure may include computational device 310-1 including exactly two services 335-1 and 335-2). Each processor 330 may be a single core processor or a multi-core processor, a graphics processing unit (GPU), a general purpose GPU (GPGPU), a System-on-a-Chip (SoC), a neural processing unit (NPU), a tensor processing unit (TPU), a field programmable gate array (FPGA), or an application-specific integrated circuit (ASIC), among other possibilities.

Computational device 310-1 may be reachable across a host protocol interface, such as host interface 340, which may be used for both management of computational device 310-1 and/or to control I/O of computational device 310-1. As with host interface 325, host interface 340 may include queue pairs for submission and completion, but other host interfaces 340 are also possible, using any native host protocol supported by computational device 310-1. Examples of such host protocols may include Ethernet, Remote Direct Memory Access (RDMA), Transmission Control Protocol/Internet Protocol (TCP/IP), InfiniB and, Peripheral Component Interconnect Express (PCIe), Serial Attached Small Computer System Interface (SCSI) (SAS), Internet SCSI (iSCSI), and Serial AT Attachment (SATA), among other possibilities. In addition, host interface 340 may support communications with other components of system 105 of FIG. 1—for example, a network interface card (NIC)—or to operate as a NIC and communicate with local and/or remote network/cloud components.

Processor(s) 330 may be thought of as near-storage processing: that is, processing that is closer to storage device 305 than processor 110 of FIG. 1. Because processor(s) 330 are closer to storage device 305, processor(s) 330 may be able to execute commands on data stored in storage device 305 more quickly than for processor 110 of FIG. 1 to execute such commands. Processor(s) 330 may have associated memory 345, which may be used for local execution of commands on data stored in storage device 305. Memory 345 may also be accessible by direct memory access (DMA) from devices other than computational storage unit 135. Memory 345 may include local memory similar to memory 115 of FIG. 1, on-chip memory (which may be faster than memory such as memory 115 of FIG. 1, but perhaps more expensive to produce), or both.

Computational storage unit 135 may also include DMA 350. DMA 350 may be used to access memories in devices other than computational storage unit 135.

Depending on the implementation, memory 345 and/or DMA 350 may be omitted, as shown by the dashed lines.

While FIG. 3A shows storage device 305 and computational device 310-1 as being separately reachable across fabric 355, embodiments of the disclosure may also include storage device 305 and computational device 310-1 being serially connected. That is, commands directed to storage device 305 and computational device 310-1 might both be received at the same physical connection to fabric 355 and may pass through one device to reach the other. For example, if computational device 310-1 is located between storage device 305 and fabric 355, computational device 310-1 may receive commands directed to both computational device 310-1 and storage device 305: computational device 310-1 may process commands directed to computational device 310-1, and may pass commands directed to storage device 305 to storage device 305. Similarly, if storage device 305 is located between computational device 310-1 and fabric 355, storage device 305 may receive commands directed to both storage device 305 and computational device 310-1: storage device 305 may process commands directed to storage device 305 and may pass commands directed to computational device 310-1 to computational device 310-1.

Services 335-1 and 335-2 may offer a number of different functions that may be executed on data stored in storage device 305. For example, services 335-1 and 335-2 may offer pre-defined functions, such as encryption, decryption, compression, and/or decompression of data, erasure coding, and/or applying regular expressions. Or, services 335-1 and 335-2 may offer more general functions, such as data searching and/or SQL functions. Services 335-1 and 335-2 may also support running application-specific code. That is, the application using services 335-1 and 335-2 may provide custom code to be executed using data on storage device 305. Services 335-1 and 335-2 may also any combination of such functions. Table 1 lists some examples of services that may be offered by processor(s) 330.

TABLE 1

| Service Types |
| --- |
| Compression |
| Encryption |
| Database filter |
| Erasure coding |
| RAID |
| Hash/CRC |
| RegEx (pattern matching) |
| Scatter Gather |
| Pipeline |
| Video compression |
| Data deduplication |
| Operating System Image Loader |
| Container Image Loader |
| Berkeley packet filter (BPF) loader |
| FPGA Bitstream loader |
| Large Data Set |

As discussed above, processor(s) 330 (and, indeed, computational device 310-1) may be implemented in any desired manner. Example implementations may include a local processor, such as a CPU or some other processor (such as an FPGA, an ASIC, or a SoC), a GPU, a GPGPU, a DPU, an NPU, an NIC, or a TPU, among other possibilities. Processor(s) 330 may also be implemented using an FPGA or an ASIC, among other possibilities. If computational device 310-1 includes more than one processor 330, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 330 may be thought of as a computational storage unit.

Some embodiments of the disclosure may include other mechanisms to communicate with storage device 305 and/or computational device 310-1. For example, storage device 305 and/or computational device 310-1 may include network interface 360, which may support communication with other devices using Ethernet, RDMA, TCP/IP, InfiniBand, SAS, iSCSI, or SATA, among other possibilities. Network interface 360 may provide another interface for communicating with storage device 305 and/or computational device 310-1. While FIG. 3A shows network interface 360 as providing communication to computational device 310-1, embodiments of the disclosure may include a network interface to storage device 305 as well. In addition, in some embodiments of the disclosure, such other interfaces may be used instead of host interfaces 325 and/or 340 (in which case host interfaces 325 and/or 340 may be omitted). Other variations, shown in FIGS. 3B-3D below, may also include such interfaces.

Figure 3B:
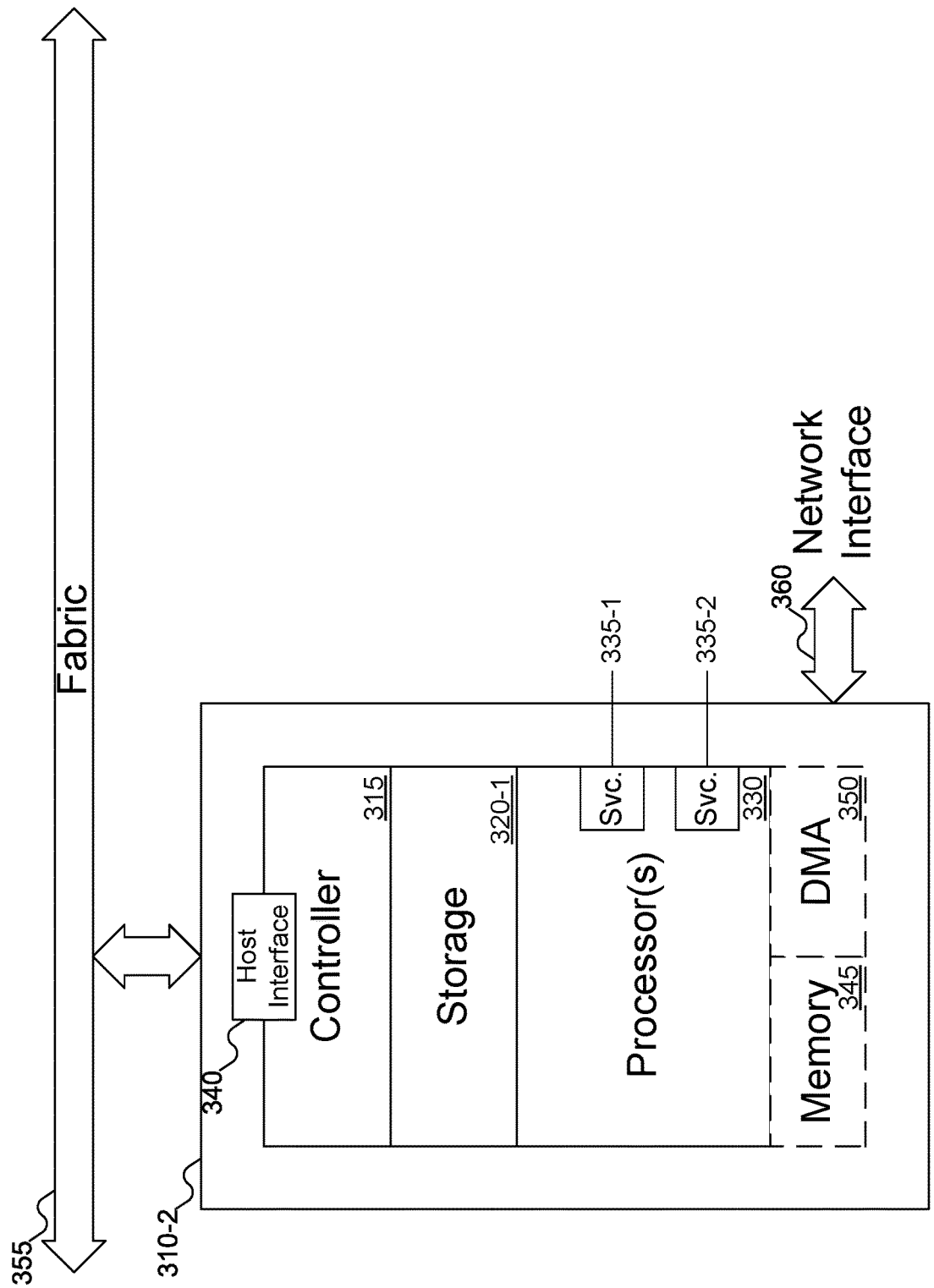
FIG. 3B shows a second example implementation of the computational storage unit of FIG. 1, according to embodiments of the disclosure.

Whereas FIG. 3A shows storage device 305 and computational device 310-1 as separate devices, in FIG. 3B they may be combined. Thus, computational device 310-2 may include controller 315, storage 320-1, processor(s) 330 offering services 335-1 and 335-2, memory 345, and/or DMA 350. As with storage device 305 and computational device 310-1 of FIG. 3A, management and I/O commands may be received via host interface 340 and/or network interface 360. Even though computational device 310-2 is shown as including both storage and processor(s) 330, FIG. 3B may still be thought of as including a storage device that is associated with a computational storage unit.

Figure 3C:
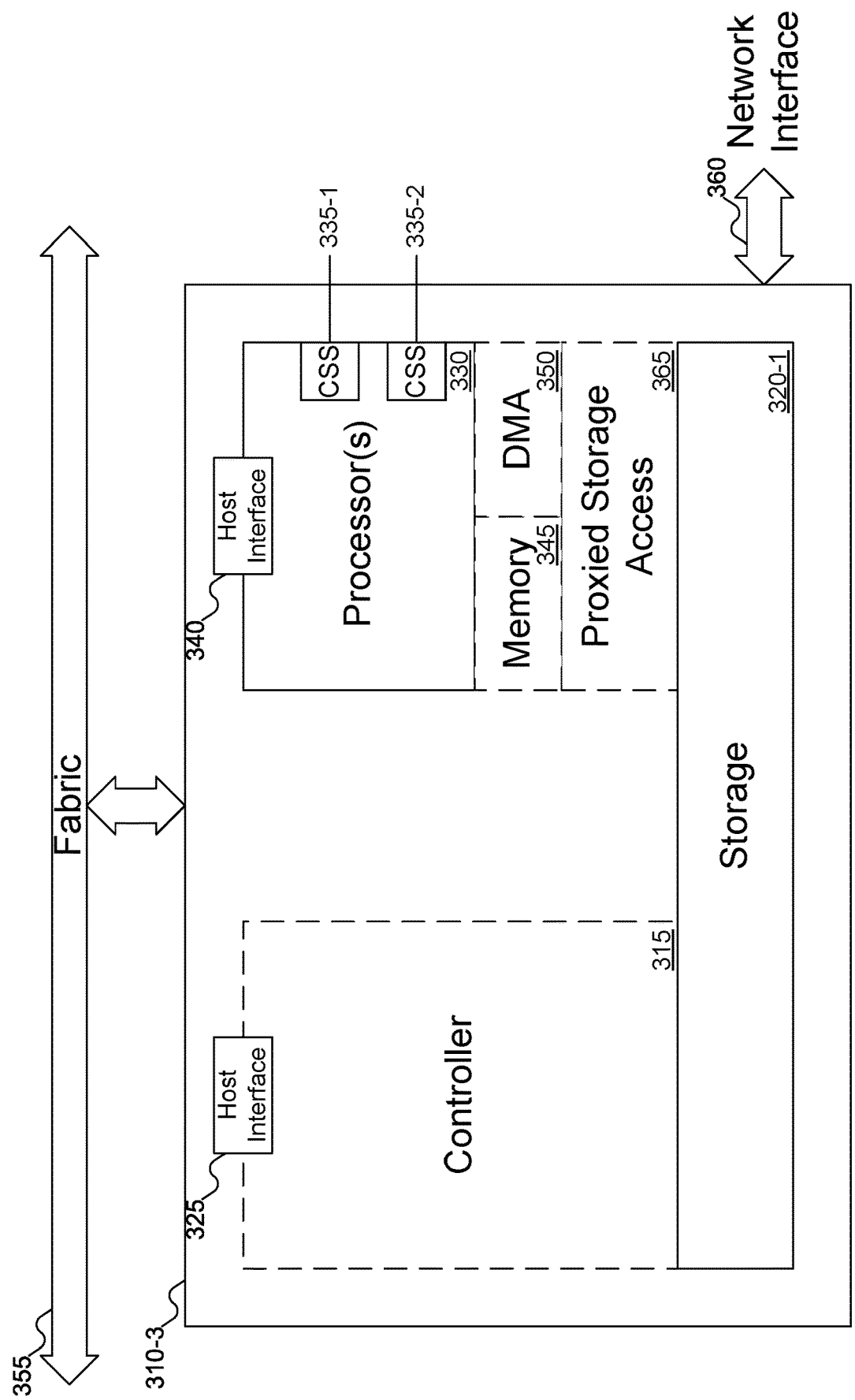
FIG. 3C shows a third example implementation of the computational storage unit of FIG. 1, according to embodiments of the disclosure.

In yet another variation shown in FIG. 3C, computational device 310-3 is shown. Computational device 310-3 may include controller 315 and storage 320-1, as well as processor(s) 330 offering services 335-1 and 335-2, memory 345, and/or DMA 350. But even though computational device 310-3 may be thought of as a single component including controller 315, storage 320-1, processor(s) 330 (and also being thought of as a storage device associated with a computational storage unit), memory 345, and/or DMA 350, unlike the implementation shown in FIG. 3B controller 315 and processor(s) 330 may each include their own host interfaces 325 and 340 and/or network interface 360 (again, which may be used for management and/or I/O). By including host interface 325, controller 315 may offer transparent access to storage 320-1 (rather than requiring all communication to proceed through processor(s) 330).

In addition, processor(s) 330 may have proxied storage access 365 to storage 320-1. Thus, instead of routing access requests through controller 315, processor(s) 330 may be able to directly access the data from storage 320-1.

In FIG. 3C, both controller 315 and proxied storage access 365 are shown with dashed lines to represent that they are optional elements, and may be omitted depending on the implementation.

Figure 3D:
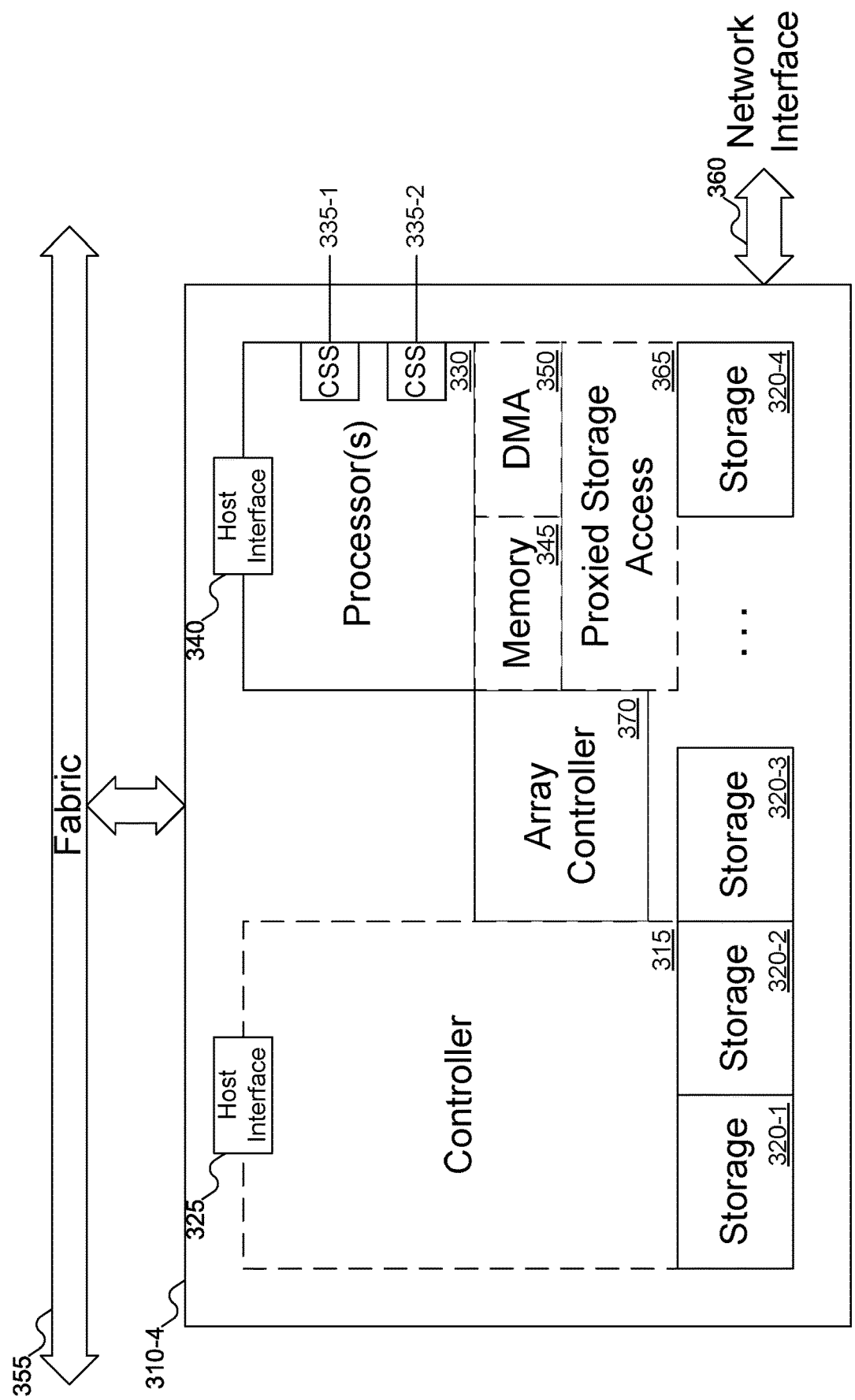
FIG. 3D shows a fourth example implementation of the computational storage unit of FIG. 1, according to embodiments of the disclosure.

Finally, FIG. 3D shows yet another implementation. In FIG. 3D, computational device 310-4 is shown, which may include controller 315, memory 345, DMA 350, and proxied storage access 365 similar to FIG. 3C. In addition, computational device 310-4 may include an array of one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 370. Array controller 370 may manage how data is stored on and retrieved from storage elements 320-1 through 320-4. For example, if storage elements 320-1 through 320-4 are implemented as some level of a Redundant Array of Independent Disks (RAID), array controller 370 may be a RAID controller. If storage elements 320-1 through 320-4 are implemented using some form of Erasure Coding, then array controller 370 may be an Erasure Coding controller.

Figure 4:
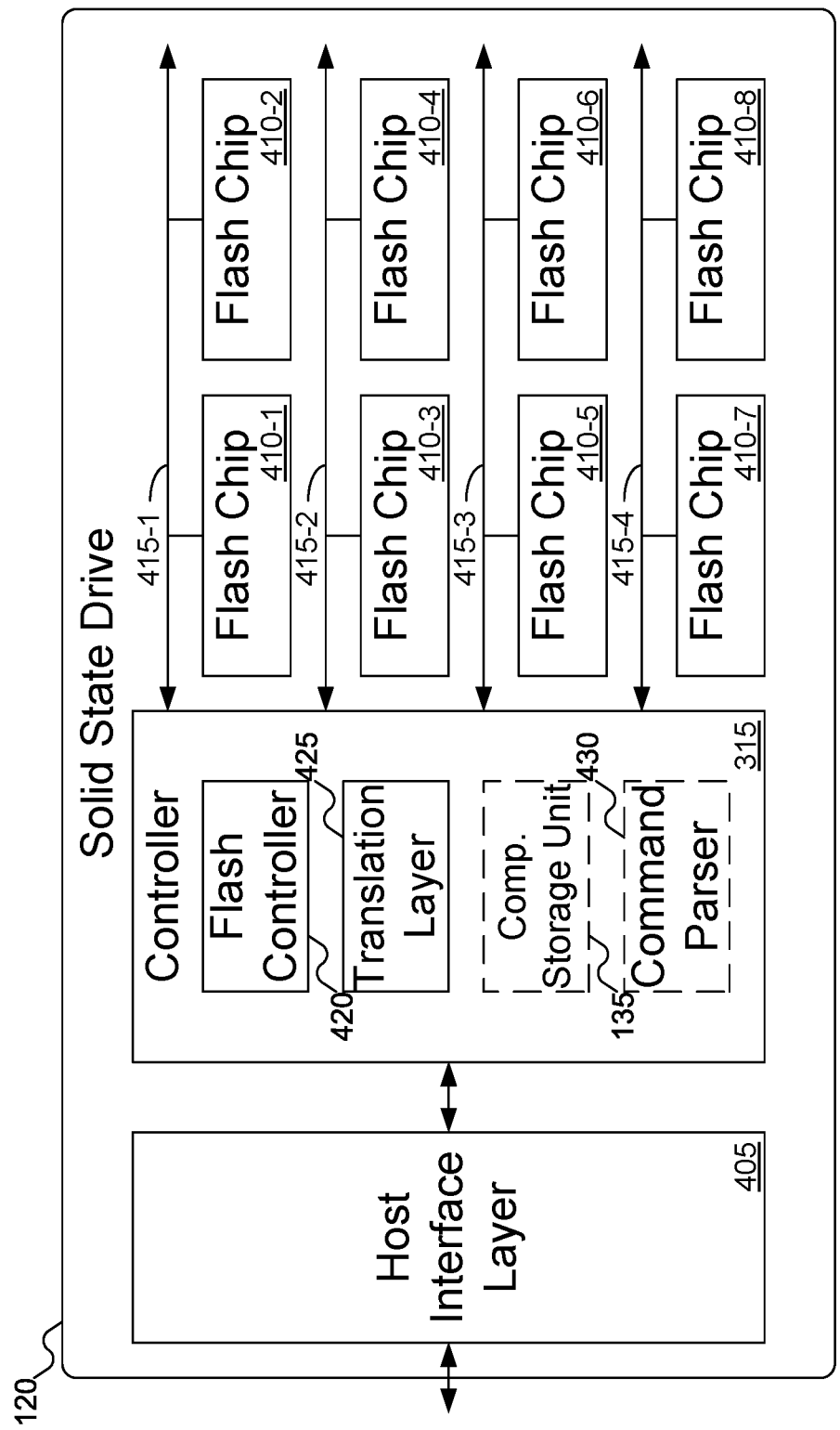
FIG. 4 shows details of the storage device of FIG. 1, according to embodiments of the disclosure.

FIG. 4 shows details of storage device 120 of FIG. 1, according to embodiments of the disclosure. In FIG. 4, the implementation of storage device 120 is shown as for a Solid State Drive. In FIG. 4, storage device 120 may include host interface layer (HIL) 405, controller 315, and various flash memory chips 410-1 through 410-8 (also termed "flash memory storage", and which may be referred to collectively as flash memory chips 410), which may be organized into various channels 415-1 through 415-4 (which may be referred to collectively as channels 415). Host interface layer 405 may manage communications between storage device 120 and other components (such as processor 110 of FIG. 1). Host interface layer 405 may also manage communications with devices remote from storage device 120. That is, host interface layer 405 may manage communications with devices other than processor 110 of FIG. 1 (for example, computational storage unit 135 of FIG. 1), and which may be local to or remote from machine 105 of FIG. 1: for example, over one or more network connections. These communications may include read requests to read data from storage device 120, write requests to write data to storage device 120, and delete requests to delete data from storage device 120.

Host interface layer 405 may manage an interface across only a single port, or it may manage interfaces across multiple ports. Alternatively, storage device 120 may include multiple ports, each of which may have a separate host interface layer 405 to manage interfaces across that port. Embodiments of the inventive concept may also mix the possibilities (for example, an SSD with three ports might have one host interface layer to manage one port and a second host interface layer to manage the other two ports).

Controller 315 may manage the read and write operations, along with garbage collection and other operations, on flash memory chips 410 using flash memory controller 420. Controller 315 may also include translation layer 425 which may manage the mapping of logical addresses (such as logical block addresses (LBAs)) as used by host 105 of FIG. 1 to physical addresses (such as physical block addresses (PBAs)) where the data is actually stored on storage device 120. By using translation layer 425, host 105 of FIG. 1 does not need to be informed when data is moved from one physical address to another within storage device 120.

In some embodiments of the disclosure, controller 315 may include computational storage unit 135. For example, embodiments of the disclosure may combine storage device 120 and computational storage unit 135 as described with reference to FIGS. 3B-3D above. Computational storage unit 135 may be omitted from storage device 120 (or perhaps more accurately, may be external to controller 315 or storage device 120), which is represented by the dashed lines around computational storage unit 135.

In some embodiments of the disclosure, controller 315 may also include command parser 430. Command parser 430 may be implemented as a circuit that may examine commands received from machine 105 of FIG. 1 and determine if the commands are intended for storage device 120 or for computational storage unit 135. Put another way, command parser 430 may determine if the command is a command that is typically processed by storage device 120 (such as a command to read data, write data, or delete data) or that is typically processed by computational storage unit 135 (such as a command to execute a program, perform some processing on data, or interact with a program). While FIG. 4 shows command parser 430 as part of controller 315, embodiments of the disclosure may place command parser 430 in other locations, such as within host interface layer 405 or outside storage device 120 entirely. Command parser 430 may be omitted from storage device 120 (or perhaps more accurately, may be external to controller 315 or storage device 120), which is represented by the dashed lines around command parser 430.

While FIG. 4 shows storage device 120 as including eight flash memory chips 410 organized into four channels 415, embodiments of the inventive concept may support any number of flash memory chips organized into any number of channels. Similarly, while FIG. 4 shows the structure of a SSD, other storage devices (for example, hard disk drives) may be implemented using a different structure from that shown in FIG. 4 to manage reading and writing data, but with similar potential benefits.

Figure 5:
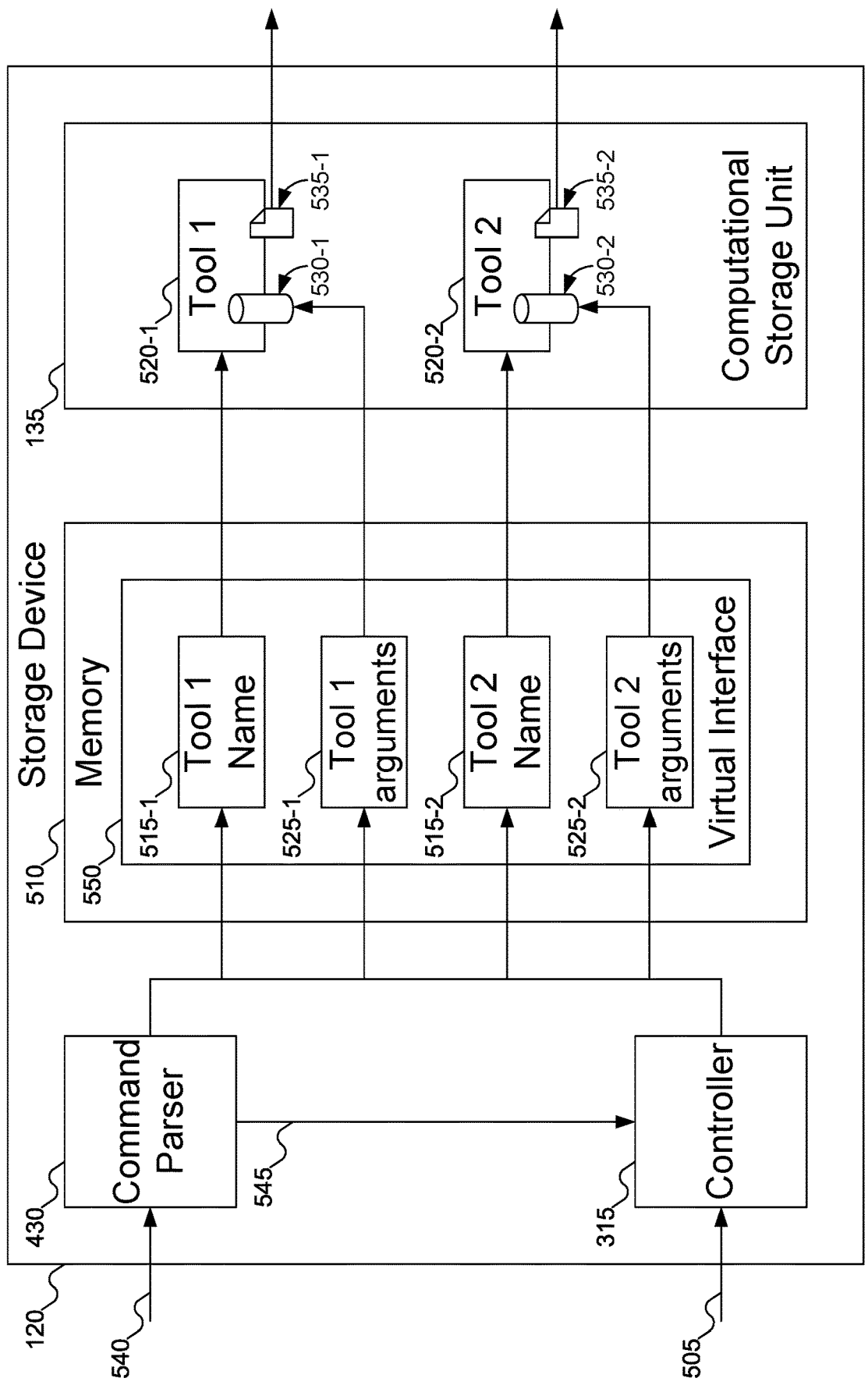
FIG. 5 shows communication with the computational storage unit of FIG. 1, according to embodiments of the disclosure.

FIG. 5 shows communication with computational storage unit 135 of FIG. 1, according to some embodiments of the disclosure. In FIG. 5, controller 315 of storage device 120 may receive commands as input 505 intended for computational storage unit 135. (Controller 315 may also receive commands intended for storage device 120 rather than for computational storage unit 135, of course.) Upon determining that the commands are not commands involving data on storage device 120 (that is, commands to read, write, or delete data as stored in, say, flash memory chips 410 of FIG. 4), controller 315 may set up the use of memory 510.

Upon receiving a command to start using a tool, controller 315 may set up files or locations 515-1 and 515-2 (which may be referred to collectively as files 515) to identify the tools to be invoked. These identifiers may then identify tools 520-1 and 520-2 (which may be referred to collectively as tools 520) running on computational storage unit 135. Files 515 may reside in the kernel of computational storage unit 135.

Controller 315 may also set up files or locations 525-1 and 525-2 (which may be referred to collectively as files 525) where arguments for these tools may be stored. Controller 315 may also establish named pipes between where files 525, where the arguments may be stored, and tools 520, which may use these arguments. Named pipes 530-1 and 530-2 (which may be referred to collectively as named pipes 530) are shown: when data is written to files 525, tools 520 may receive these data by virtue of named pipes 530. Like files 515, files 525 may reside in the kernel of computational storage unit 135.

A pipe may be thought of as a link between a source of data and a destination of data. Pipes may be named, in which case the pipe exists until the pipe is explicitly removed, or may be unnamed, in which case the pipe is removed by the system automatically once its use is completed. For example, the UNIX® operating system uses the symbol "|" to identify the use of an unnamed pipe. (UNIX is a registered trademark of The Open Group.) As an example of its use, the UNIX operating system command "ls|more" may be understood to generate a listing of the contents of the current directory (the "ls" command) and pipe it into a command that pauses the display of data after every screenful to let the user review the data (the "more" command). This pipe, being unnamed, is removed as soon as the commands are both complete.

A pipe (whether named or unnamed), is thus a way to move data from one program to another: one program may place the data into the pipe, and the other program may pull the data out of the pipe.

A named pipe, on the other hand, may be thought of as a special type of file. A named pipe may be created using an appropriate command. The named pipe may have a name that appears in the directory just like any other type of file. But the named pipe may remain in place until removed by another appropriate command. As an example, the UNIX operating system command "mkfifo mypipe" may be used to create a named pipe with the file name "mypipe".

A named pipe may be used just like an unnamed pipe. The difference is that because the named pipe continues to exist until removed, the named pipe may be used as part of on-going commands. For example, the following two separate commands may achieve a result similar to the command "ls|more" described above: "ls>mypipe" and "more<mypipe". The ">" symbol may be used to redirect the standard output (which is frequently sent to the user's display) to the file "mypipe"; the "<" symbol may be used to redirect the standard input (which is frequently taken from the user's keyboard").

But there is one difference between using an unnamed pipe and a named pipe in these commands. In general, processes block while waiting to send data to a pipe or receive data from a pipe. For example, the "ls>mypipe" command can send some data to the file "mypipe". But once there is data in the file "mypipe", the "ls" command may block until the file "mypipe" is empty and more data may be placed in the file "mypipe". Similarly, the "more<mypipe" command may receive data from the file "mypipe". But if there is currently no data in the file "mypipe", then the "more" command may block until there is more data in the file "mypipe". Thus, it may not be possible for both of these commands to be run within the same instance of the operating system (although they may be run in different instances of the operating system).

With this understanding, the function of named pipes 530 may be understood. Named pipes 530 may be connections between data written into files 525 and the inputs to tools 520. When controller 315 receives a command that includes arguments for tools 520, controller 315 may write that command into files 525, and named pipes 530 may ensure that those commands are received as input by tools 520.

While the above discussion focuses on the use of named pipes 530 to connect files 525 and the inputs to tools 520, embodiments of the disclosure may use other techniques to connect files 525 with the inputs to tools 520. For example, files 525 may represent the tails of queues used to provide input to tools 520.

Finally, as part of processing the command to start using a new tool, controller 315 may also establish log files 535-1 and 535-2 (which may be referred to collectively as log files 535) to receive the output of tools 520. By establishing log files 535, the applications invoking tools 520 may have access to the results produced by tools 520. The use of log files 535 is discussed further with reference to FIGS. 6A-6B below.

While FIG. 5 suggests that memory 510 is part of storage device 120 and not part of computational storage unit 135, embodiments of the disclosure may include memory 510 as part of computational storage unit 135, or as separate from (but accessible from) both storage device 120 and computational storage unit 135.

As discussed with reference to FIG. 4 above, in some embodiments of the disclosure command parser 430, which may reduce the processing of controller 315 to just those commands related to storage. In such embodiments of the disclosure, command parser 430 may receive commands as input 540. Command parser 430 may then determine if the commands are storage commands to be processed by controller 315 or for computational storage unit 135. If the command are storage commands, then command parser 430 may deliver the commands to controller 315 as shown by line 545; otherwise, command parser 430 may perform the functions controller 315 is described above as performing with regard to computational storage unit 135.

U.S. patent application Ser. No. 17/482,412, filed Sep. 22, 2021, which claims the benefit of U.S. Provisional Patent Application Ser. No. 63/223,544, filed Jul. 19, 2021, both of which are incorporated by reference herein for all purposes, describes how a command parser may be used to direct to a storage device or a computational storage unit, depending on the command. Command parser 430 may operate similarly, directing commands to controller 315 or to files 515 or 525, depending on the command received as input 540.

While FIG. 5 shows two tools 520, each with files 515 for the identifiers of tools 520 and files 525 for arguments for tools 520, embodiments of the disclosure may include any number (one or more) tools enabled in this manner. Further, each tool 520 may have any number of files: for example, tool 520-1 might have two files 525 established for arguments rather than just one.

While it is possible for controller 315 (or command parser 430) to establish files 515 and 525 in memory 510 where tool information may be stored, to create name pipes 530, and to route output to log files 535, some or all of these operations may involve interacting with the kernel of the operating system running on computational storage unit 135. Such operations, while straightforward to implement, may nevertheless require some processing by controller 315 or command parser 430 to perform. Such processing may take up a measurable amount of code in controller 315 or command parser 430. Since the storage for code in controller 315 or command parser 430 may be relatively small, it may be beneficial to shift this processing to another module.

U.S. patent application Ser. No. 17/583,179, filed Jan. 24, 2022, which claims the benefit of U.S. Provisional Patent Application Ser. No. 63/289,633, filed Dec. 14, 2021, both of which are incorporated by reference herein for all purposes, describes how a virtual interface, such as virtual interface 550, may be used to establish these connections, freeing controller 315 or command parser 430 from having to carry out these operations. In U.S. patent application Ser. No. 17/583,179, files 515 and 525 may be termed buckets, and may be other than files or locations in memory 510.

By placing data in buckets 515 or 525, virtual interface 550 may be triggered to perform certain actions. For example, by placing arguments in buckets 525, virtual interface 550 may be triggered to issue a command to tool 520.

Figure 6A:
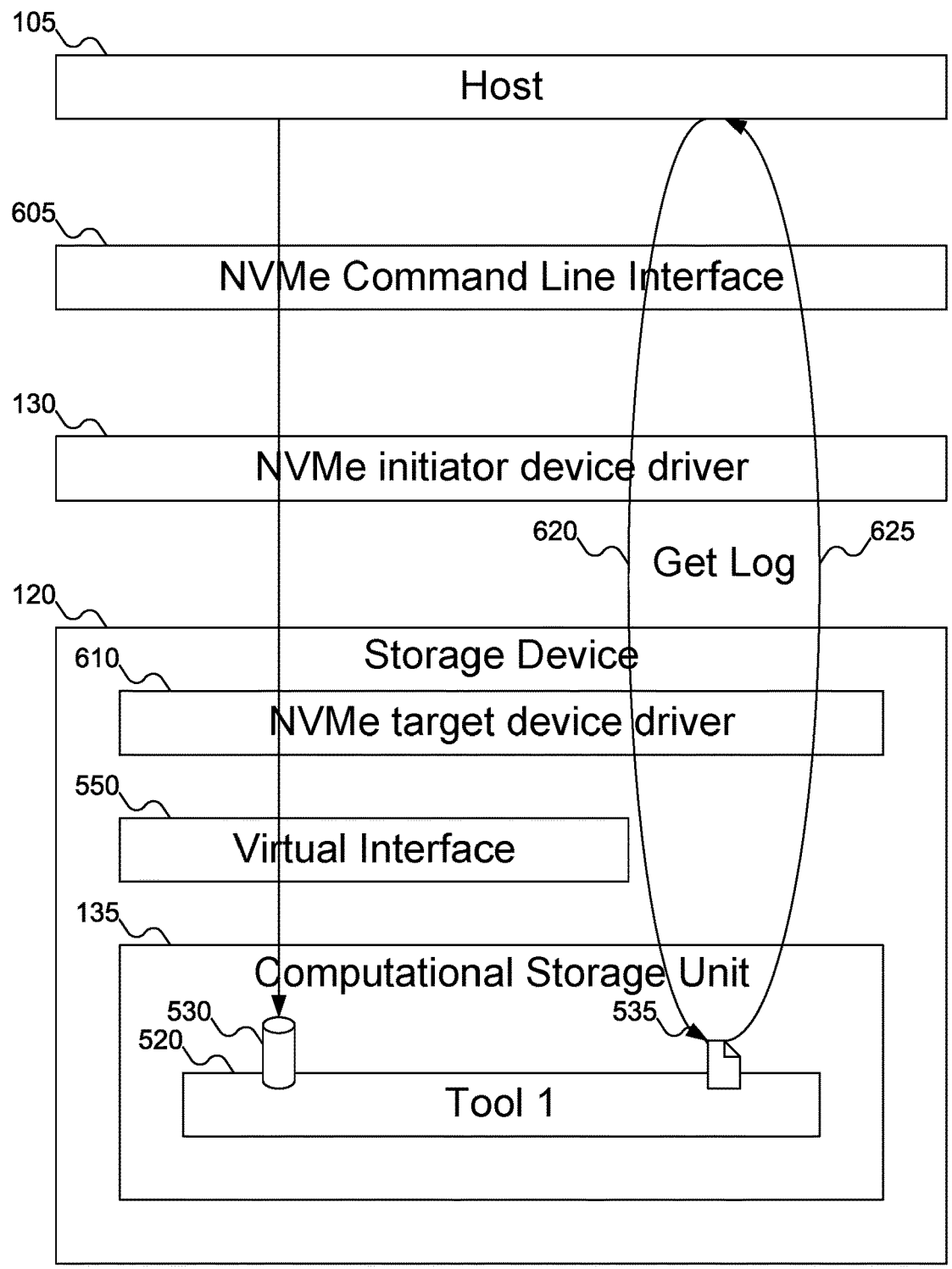
FIG. 6A shows input to and output from the computational storage unit of FIG. 1 across various layers, according to some embodiments of the disclosure.

FIG. 6A shows input to and output from computational storage unit 135 of FIG. 1 across various layers, according to some embodiments of the disclosure. In FIG. 6A, a command including arguments for tool 520 may be issued (that is, files 515 and 525 of FIG. 5 may already be established, named pipes 530 may already have been created, and outputs of tools 520 may already have been routed to log files 535). Host 105 may issue a command including arguments to use with tool 520. Host 105 may issue a command, such as an NVMe command, which may be issued using, for example, NVMe command line interface 605. The command may be passed from command line interface 605 to the host-side device driver (such as device driver) via an input/output control (IOCTL), which may in turn pass the command to device-side device driver 610. Device-side device driver 610 may then copy the arguments from the user space of computational storage unit 135 to the kernel space of computational storage unit 135 (which may enable tool 520 to access the arguments). Once the data is received on the kernel side of computational storage unit 135, virtual interface 550 may be triggered to place the data in named pipe 530 and to execute a command using tool 520 (which may use the data placed in named pipe 530).

Eventually, data may be written to log file 535. Host 105 may then issue periodic commands to get the output from log file 535. For example, host 105 may have an instance of the operating system running periodic calls (for example, every two seconds or every five seconds) to get the output from log file 535, and to display the output to the user.

Figure 6B:
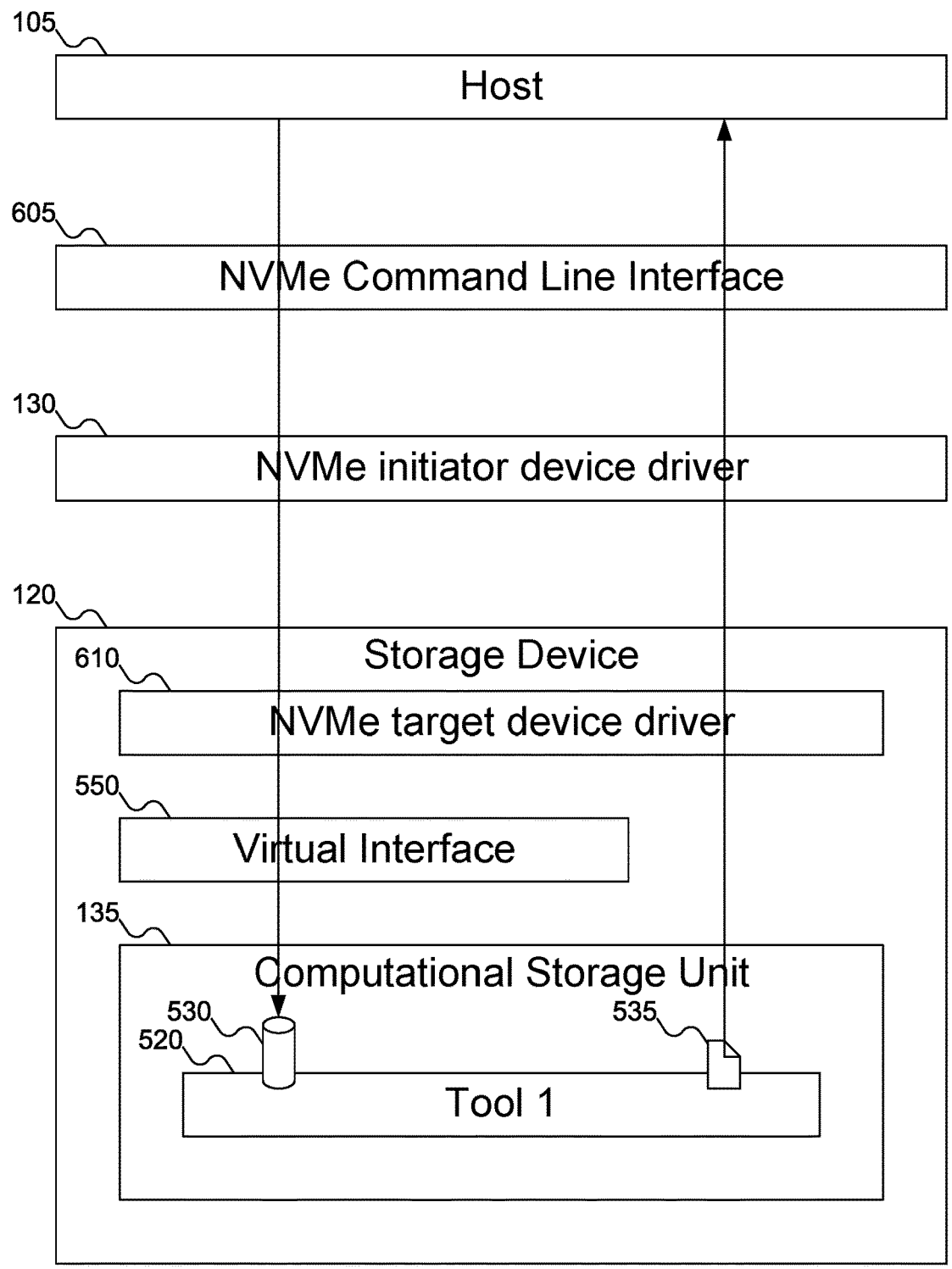
FIG. 6B shows input to and output from the computational storage unit of FIG. 1 across various layers, according to other embodiments of the disclosure.

FIG. 6B shows input to and output from computational storage unit 135 of FIG. 1 across various layers, according to other embodiments of the disclosure. In FIG. 6B, the process of sending a command from host 105 to computational storage unit 135 is the same. But in FIG. 6B, embodiments of the disclosure may recognize that various data structures may be used to send the command from host 105 to computational storage unit 135. Frequently, the only information returned as a result of the calls from, for example, host 105 to command line interface 605, from command line interface 605 to host-side device driver 130, or from host-side device driver 130 to device-side device driver 610 is an indicator of whether the command succeeded or failed. But these data structures may include space for a result to be returned. Embodiments of the disclosure may leverage the existence of these data structures to store the output of tool 520 back to host 105. That is, these data structures may be used to return data from tool 520 to device-side device driver 610, to host-side device driver 130, to command line interface 605, and back to host 105. In this manner, host 105 may receive the output without having to query log file 535 for the output.

FIG. 7A shows an example program that may be run on computational storage unit 135 of FIG. 1, according to embodiments of the disclosure. In FIG. 7A, source code 705 is shown. Source code 705 may be, for example, a C program being debugged on computational storage unit 135 of FIG. 1. The numbers at the beginning of each line are line numbers in the document, and should not be considered part of source code 705.

FIG. 7B shows example commands that may be sent to computational storage unit 135 of FIG. 1 for program 705 shown in FIG. 7A and their corresponding outputs, according to embodiments of the disclosure. In FIG. 7B, input window 710 and output window 715 of the operating system are shown. FIG. 7B may represent an embodiment of the disclosure where the output of tool 520 of FIG. 5 is routed to log file 535 of FIG. 5, as described with reference to FIG. 6A above; if an embodiment of the disclosure using data structures to return data from tool 520 of FIG. 5 to host 105 of FIG. 1 is used as described with reference to FIG. 6B above, then the commands and the resulting output may be intermingled in a single display. For ease of reference, dashed lines are shown separate the various commands (on the host side) in input window 710 and the interactive results (on the computational storage unit side) in output window 715; in some embodiments of the disclosure, such alignment might be omitted.

In input window 710, the command "nvme debug /dev/nvme0n1 -b '/root/slot_0/a.out'" may represent a command to start a debugging of program 705 of FIG. 7A. The '-b' option may identify the executable to be debugged. The tool, a debugging tool (identified as 'debug' in the command), may be started, with buckets 515 and 525 of FIG. 5 being established, the debugging program started on computational storage unit 135 of FIG. 1 as tool 520 (and with program 705 of FIG. 7A provided to the debugging program, identified as '/root/slot_0/a.out'). '/dev/nvme0n1' may identify the particular instance of the tool being used (in case multiple tools are running). Note that output window 715 may include no result from starting the debugging program.

Because the command "nvme debug /dev/nvme0n1 -b '/root/slot_0/a.out'" is used to debug an executable, the debugging tool may be implicitly identified in the command. In other embodiments of the disclosure, a command may include the -t option to identify a particular tool to be executed. Depending on the tool in question, various options (other than "-b" shown above or "-a" shown below) may also be used.

In input window 710, the command "nvme debug /dev/nvme0n1 -a 'break 7'" may represent a request to establish a breakpoint at line 7 of program 705 of FIG. 7A. In output window 715, the debugging program may return output indicating that the breakpoint has been established.

In input window 710, the command "nvme debug /dev/nvme0n1 -a 'run'" may represent a request to start running program 705 of FIG. 7A. In output window 715, the debugging program may return output indicating that execution of program 705 of FIG. 7A has begun. When execution reaches line 7 of program 705 of FIG. 7A, execution may pause, permitting host 105 of FIG. 1 to issue further commands, and output window 715 may show that execution has paused at line 7 of program 705 of FIG. 7A.

In input window 710, the command "nvme debug /dev/nvme0n1 -a 'bt'" may represent a request to perform a back trace on program 705 of FIG. 7A. In output window 715, the results of the back trace may be shown, with functions function_2 ( ), function_1 ( ), and main ( ) currently on the stack (and the line of code where those functions were called).

In input window 710, the command "nvme debug /dev/nvme0n1 -a 'break 30'" may represent a request to establish a breakpoint at line 30 of program 705 of FIG. 7A. In output window 715, the debugging program may return output indicating that the breakpoint has been established.

In input window 710, the command "nvme debug /dev/nvme0n1 -a 'continue'" may represent a request to continue running program 705 of FIG. 7A (continuing from line 7 where the first breakpoint occurred). In output window 715, the debugging program may return output indicating that execution of program 705 of FIG. 7A has continued. When execution reaches line 39 of program 705 of FIG. 7A, execution may pause, permitting host 105 of FIG. 1 to issue further commands, and output window 715 may show that execution has paused at line 30 of program 705 of FIG. 7A.

In input window 710, the command "nvme debug /dev/nvme0n1 -a 'print x'" may represent a request to output the value of the variable x in program 705 of FIG. 7A. In output window 715, the debugging program may show the value of variable x (represented by the compiler token "$1") as the value 5.

In input window 710, the command "nvme debug /dev/nvme0n1 -a 'print y'" may represent a request to output the value of the variable y in program 705 of FIG. 7A. In output window 715, the debugging program may show the value of variable y (represented by the compiler token "$2") as the value 10.

In input window 710, the command "nvme debug /dev/nvme0n1 -a 'q'" may represent a request to quit the debugging program. In output window 715, the debugging program may return output indicating that the debugging program has terminated.

Figure 8:
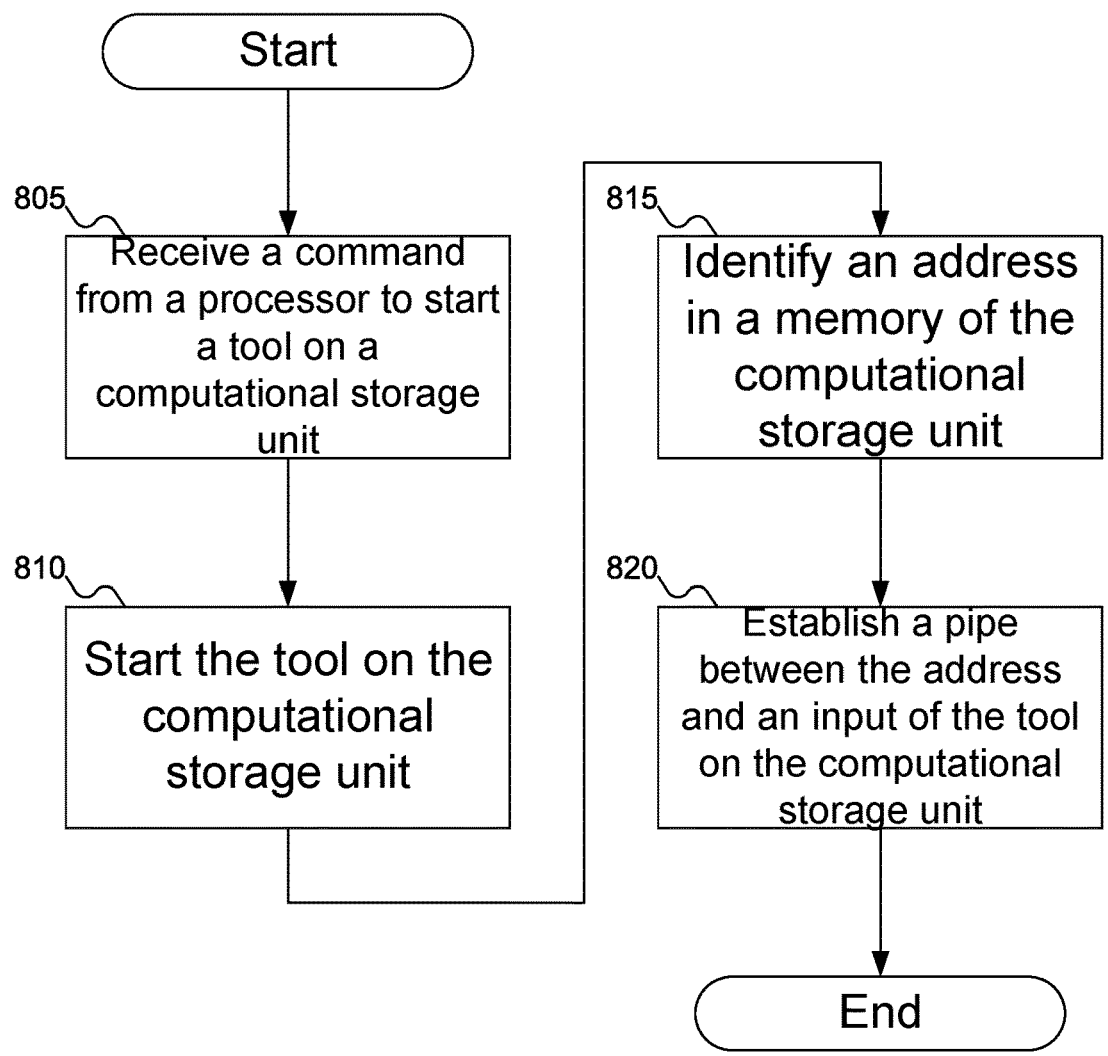
FIG. 8 shows a flowchart of an example procedure for establishing interactive communication with the computational storage unit of FIG. 1, according to embodiments of the disclosure.

FIG. 8 shows a flowchart of an example procedure for establishing interactive communication with computational storage unit 135 of FIG. 1, according to embodiments of the disclosure. In FIG. 8, at block 805, controller 315 of FIG. 3 (or command parser 430 of FIG. 4) may receive from processor 110 of FIG. 1 a command to start tool 520 of FIG. 5 on computational storage unit 135 of FIG. 1. At block 810, controller 315 of FIG. 3 (or command parser 430 of FIG. 4) may start tool 520 of FIG. 5. At block 815, virtual interface 550 of FIG. 4 (or controller 315 of FIG. 3 or command parser 430 of FIG. 4) may identify buckets (files) 515 and/or 525 of FIG. 5 where information from the command may be placed for use by tool 520 of FIG. 5. Finally, at block 820, virtual interface 550 of FIG. 4 (or controller 315 of FIG. 3 or command parser 430 of FIG. 4) may establish named pipe 530 of FIG. 5 between buckets (files) 525 of FIG. 5 and an input of tool 520 of FIG. 5.

Figure 9:
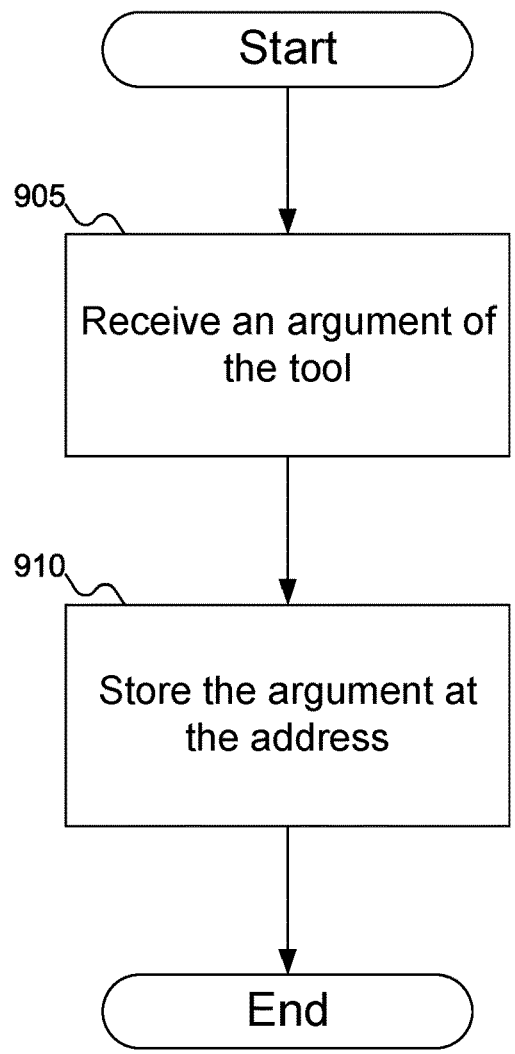
FIG. 9 shows a flowchart of an example procedure for processing an argument of the tool of FIG. 5, according to embodiments of the disclosure.

FIG. 9 shows a flowchart of an example procedure for processing an argument of tool 520 of FIG. 5, according to embodiments of the disclosure. In FIG. 9, at block 905, controller 315 of FIG. 3 (or command parser 430 of FIG. 4) may receive an argument of tool 520 of FIG. 5. At block 910, controller 315 of FIG. 3 (or command parser 430 of FIG. 4) may store the argument in bucket (files) 525 of FIG. 5. This may, for example, trigger virtual interface 550 to deliver the argument to tool 520 of FIG. 5 via named pipe 530 of FIG. 5.

Figure 10:
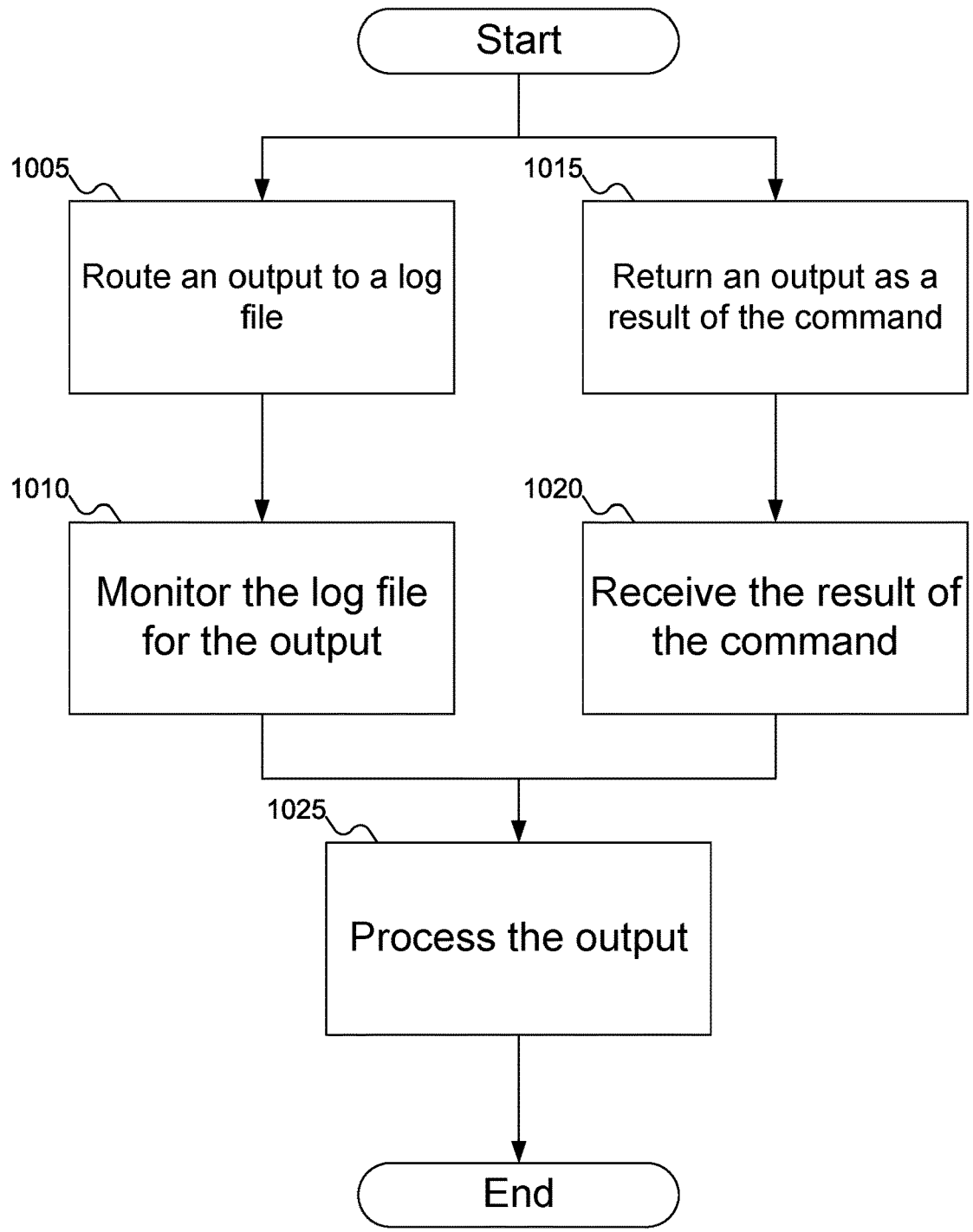
FIG. 10 shows a flowchart of an example procedure for the handling output from the computational storage unit of FIG. 1, according to embodiments of the disclosure.

FIG. 10 shows a flowchart of an example procedure for the handling output from computational storage unit 135 of FIG. 1, according to embodiments of the disclosure. In FIG. 10, at block 1005, virtual interface 550 of FIG. 4 (or controller 315 of FIG. 3 or command parser 430 of FIG. 4) may route an output of tool 520 of FIG. 5 to log file 535 of FIG. 5, and at block 1010, processor 110 of FIG. 1 may monitor log file 535 of FIG. 5 for any new output to be stored in log file 535 of FIG. 5.

Alternatively, at block 1015, virtual interface 550 of FIG. 4 (or controller 315 of FIG. 3 or command parser 430 of FIG. 4) may identify an output of tool 520 of FIG. 5 and return that output as a result of the command to processor 110 of FIG. 1, and at block 1020 processor 110 of FIG. 1 may receive the output of tool 520 of FIG. 5 as a result of the command.

Either way, at block 1025, processor 110 of FIG. 1 may process the output of tool 520 of FIG. 5 in any desired manner: for example, by presenting the output to the user.

Figure 11:
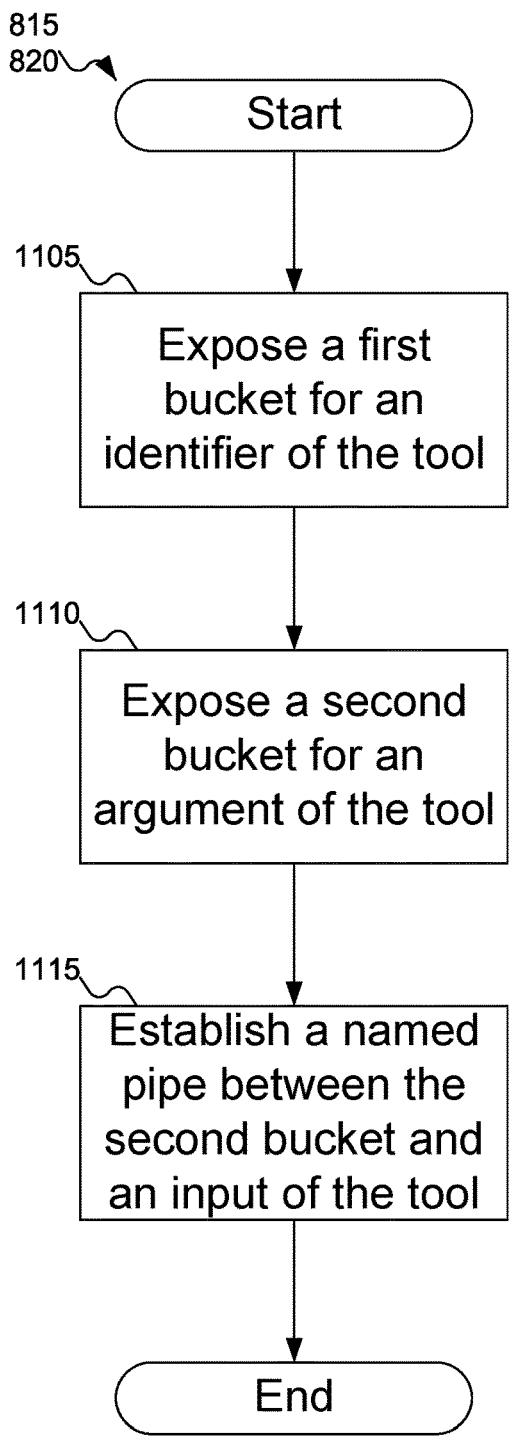
FIG. 11 shows a flowchart of an example procedure for using the virtual interface of FIG. 5 to establish interactive communication with the computational storage unit of FIG. 1, according to embodiments of the disclosure.

FIG. 11 shows a flowchart of an example procedure for using virtual interface 550 of FIG. 5 to establish interactive communication with computational storage unit 135 of FIG. 1, according to embodiments of the disclosure. In FIG. 11, at block 1105, virtual interface 550 of FIG. 5 may expose bucket 515 of FIG. 5 as an identifier of tool 520 of FIG. 5. At block 1110, virtual interface 550 of FIG. 5 may expose bucket 525 of FIG. 5 for an argument of tool 520 of FIG. 5. Finally, at block 1115, virtual interface 550 of FIG. 5 may use virtual interface 550 of FIG. 5 to establish named pipe 530 of FIG. 5 between bucket 525 of FIG. 5 and an input of tool 520 of FIG. 5.

In FIGS. 8-11, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a computational device. The system may include a controller in a storage device or a command parser which may receive commands to use a tool running on the storage device. A named pipe may be established between a file in a memory and an input of the tool. The use of a named pipe provides a technical advantage in that multiple commands may be sent to the same tool for overall use of the tool.

In addition, the output of the tool may be redirected to a log file, which the host may monitor, or returned as a result of the command. By returning output from the tool to the host a technical advantage of interaction with the tool is achieved.

Computational devices might lack the infrastructure to achieve interactive communication between host and the programs running inside the device. Executing a program inside the computational device might require the SSD controller to interact with the computational device to execute the program. Once the program is executed, there might be no way to keep a handle on the program to interactively pass commands and get results back. The results created may be invisible to the user, so the user might not see the results for the commands they sent and might not be able to interact with the tool that is running.

Embodiments of the disclosure may include a mechanism that allow users on the host side to communicate in an interactive fashion with tools running inside the computational device and pass commands directly to these tools over, for example, NVMe interface. A virtual interface 550 of FIG. 5 may be used to expose kernel objects to user space that can be used as triggers: (1) to start specific tools inside the computational device with any default arguments; and (2) to pass commands interactively to the same tool that got started and see results passed back to the host. A named pipe may be created to lock the input to the tool to pass further arguments and keep the commands getting passed to the same process ID.

Embodiments of the disclosure may enable the virtual interface 550 of FIG. 5 to contain kernel objects (buckets) to transfer data between FW and computational device. The first object may pass the program/tool name to invoke. This process triggers the following actions in the computational device: (1) starting the tool; (2) creating an input pipe to the tool; and (3) redirecting output to a log file instead of the tool graphical user interface (GUI). At this point, the user may pass arguments directly to the tool through the pipe. A host program may pull the result using a "get_log" command periodically or through a command to see the results in real time or near real time.

A driver or firmware 12 of FIGS. 6A-6B may be used to pass the arguments from the command into the virtual interface buckets. A command parser may be used to check that the coming commands are properly formatted. Using a command parser may free the firmware to do other tasks, and might be more efficient. Any storage command may be passed to the storage device; computational device trace commands may be rerouted to the computational device.

Embodiments of the disclosure enable the ability for host programs to interact with various tools and utilities inside the computational device without extra overhead to do debugging, profiling, tracing or any other functions the tools or programs inside the device have. The mechanism described may bridge the gap between host side and device side without the extra overhead. There may be no need for device server side implementation to receive commands, or for transmission protocols or sockets to achieve host to device communication. Since the tools are running natively in the same environment, there are no concerns about compatibility or environment related bugs.

Embodiments of the disclosure enable a user experience similar/close to interacting directly with programs on the host side.

The use of a virtual interface may hide the complexity of the kernel, virtualize the important hooks as kernel objects and hide the rest of the system, and provide a cleaner interface that exposes what is relevant.

Embodiments of the disclosure provide an interface that may be inserted in any kernel release without making changes to the system, thus offering portability. In addition, embodiments of the disclosure may be inserted in any new device and achieve the same goals regardless of the type of the device.

Embodiments of the disclosure enable automatic clean-up of directories and files, when the computational device is removed from the system. When the module is removed all hooks/objects and files generated in that path will be removed.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising: a computational storage unit, the computational storage unit including a memory and a tool;
a command parser to receive a command and to start the tool on the computational storage unit; and
a pipe between a file in the memory and an input of the tool.

Statement 2. An embodiment of the disclosure includes the system according to statement 1, wherein the command parser is configured to receive the command from a processor.

Statement 3. An embodiment of the disclosure includes the system according to statement 1, wherein the command parser is configured to receive a second command including an argument and to store the argument at the file.

Statement 4. An embodiment of the disclosure includes the system according to statement 3, wherein the command parser is configured to receive the second command including the argument from a processor and to store the argument at the file.

Statement 5. An embodiment of the disclosure includes the system according to statement 3, wherein the tool is triggered to retrieve the argument from the pipe based at least in part on the argument being stored at the file.

Statement 6. An embodiment of the disclosure includes the system according to statement 1, wherein a processor may interact with the tool.

Statement 7. An embodiment of the disclosure includes the system according to statement 6, wherein the processor may interact with the tool in real time.

Statement 8. An embodiment of the disclosure includes the system according to statement 6, wherein the processor may interact with the tool in near real time.

Statement 9. An embodiment of the disclosure includes the system according to statement 1, further comprising:
a storage device including a controller,
wherein the controller includes the command parser.

Statement 10. An embodiment of the disclosure includes the system according to statement 1, wherein the computational storage unit includes a log file to store an output of the tool.

Statement 11. An embodiment of the disclosure includes the system according to statement 10, further comprising a processor configured to monitor the log file for the output and to process the output.

Statement 12. An embodiment of the disclosure includes the system according to statement 1, wherein:
the computational storage unit is configured to return an output of the tool as a result of the second command; and
The system further comprises a processor configured to process the output.

Statement 13. An embodiment of the disclosure includes the system according to statement 1, further comprising a virtual interface to the computational storage unit.

Statement 14. An embodiment of the disclosure includes the system according to statement 13, wherein the virtual interface is configured to establish the pipe between the file and the input of the tool.

Statement 15. An embodiment of the disclosure includes the system according to statement 14, wherein the virtual interface is configured to expose a kernel object to a user space as a trigger.

Statement 16. An embodiment of the disclosure includes the system according to statement 14, wherein the virtual interface includes:
a first bucket for an identifier of the tool; and
a second bucket for an argument of the tool.

Statement 17. An embodiment of the disclosure includes the system according to statement 16, wherein the second bucket includes the file.

Statement 18. An embodiment of the disclosure includes the system according to statement 16, wherein the command parser is configured to receive the argument of the tool and store the argument of the tool in the second bucket.

Statement 19. An embodiment of the disclosure includes the system according to statement 1, wherein the command includes a Non-Volatile Memory Express (NVMe) command.

Statement 20. An embodiment of the disclosure includes the system according to statement 1, wherein the command includes a debugging command.

Statement 21. An embodiment of the disclosure includes the system according to statement 1, wherein:
  the command parser is configured to receive a second command and to start a second tool on the computational storage unit; and
  the system further comprises a second pipe between a second file in the memory and a second input of the second tool.

Statement 22. An embodiment of the disclosure includes a method, comprising:
  receiving a command to start a tool on a computational storage unit;
  starting the tool on the computational storage unit;
  identifying a file in a memory of the computational storage unit; and
  establishing a pipe between the file and an input of the tool on the computational storage unit.

Statement 23. An embodiment of the disclosure includes the method according to statement 22, wherein receiving the command to start the tool on the computational storage unit receiving the command from a processor to start the tool on the computational storage unit Statement 24. An embodiment of the disclosure includes the method according to statement 22, further comprising:
  receiving an argument of the tool; and
  storing the argument of the tool at the file.

Statement 25. An embodiment of the disclosure includes the method according to statement 24, wherein receiving the argument of the tool receiving the argument of the tool from a processor.

Statement 26. An embodiment of the disclosure includes the method according to statement 24, wherein storing the argument of the tool at the file includes triggering the tool to retrieve the argument from the pipe.

Statement 27. An embodiment of the disclosure includes the method according to statement 24, wherein:
  receiving the argument of the tool includes receiving the argument of the tool by a controller of a storage device; and
  storing the argument of the tool at the file includes storing the argument of the tool at the file by the controller of the storage device.

Statement 28. An embodiment of the disclosure includes the method according to statement 22, wherein a processor may interact with the tool.

Statement 29. An embodiment of the disclosure includes the method according to statement 28, wherein the processor may interact with the tool in real time.

Statement 30. An embodiment of the disclosure includes the method according to statement 28, wherein the processor may interact with the tool in near real time.

Statement 31. An embodiment of the disclosure includes the method according to statement 22, further comprising routing an output of the tool to a log file.

Statement 32. An embodiment of the disclosure includes the method according to statement 22, further comprising:
  monitoring the log file by a processor for the output; and
  processing the output by the processor.

Statement 33. An embodiment of the disclosure includes the method according to statement 22, further comprising returning an output of the tool as a result of the command.

Statement 34. An embodiment of the disclosure includes the method according to statement 33, further comprising:
  receiving the result of the command by a processor; and
  processing the output by the processor.

Statement 35. An embodiment of the disclosure includes the method according to statement 22, wherein establishing the pipe between the file and the input of the tool on the computational storage unit includes using a virtual interface to establish the pipe between the file and the input of the tool.

Statement 36. An embodiment of the disclosure includes the method according to statement 35, wherein using the virtual interface to establish the pipe between the file and the input of the tool includes exposing a kernel object to a user space as a trigger.

Statement 37. An embodiment of the disclosure includes the method according to statement 35, wherein exposing the kernel object to the user space as the trigger includes:
  exposing a first bucket for an identifier of the tool; and
  exposing a second bucket for an argument of the tool.

Statement 38. An embodiment of the disclosure includes the method according to statement 37, wherein the second bucket includes the file.

Statement 39. An embodiment of the disclosure includes the method according to statement 37, further comprising:
  receiving the argument of the tool; and
  storing the argument of the tool in the second bucket.

Statement 40. An embodiment of the disclosure includes the method according to statement 39, wherein receiving the argument of the tool includes receiving the argument of the tool from a processor.

Statement 41. An embodiment of the disclosure includes the method according to statement 22, wherein the command includes a Non-Volatile Memory Express (NVMe) command.

Statement 42. An embodiment of the disclosure includes the method according to statement 22, wherein the command includes a debugging command.

Statement 43. An embodiment of the disclosure includes the method according to statement 22, further comprising:
  receiving a second command to start a second tool on the computational storage unit;
  starting the second tool on the computational storage unit;
  identifying a second file in the memory of the computational storage unit; and
  establishing a second pipe between the second file and a second input of the second tool on the computational storage unit.

Statement 44. An embodiment of the disclosure includes the method according to statement 43, wherein receiving the second command to start the second tool on the computational storage unit includes receiving the second command from a processor to start the second tool on the computational storage unit.

Statement 45. An embodiment of the disclosure includes the method according to statement 22, wherein:
  receiving the command to start the tool on the computational storage unit includes receiving the command to start the tool on the computational storage unit at a controller of a storage device; and
  starting the tool on the computational storage unit includes starting the tool on the computational storage unit by the controller of the storage device.

Statement 46. An embodiment of the disclosure includes the method according to statement 22, wherein:
- receiving the command to start the tool on the computational storage unit includes receiving the command to start the tool on the computational storage unit at a command parser; and
- starting the tool on the computational storage unit includes starting the tool on the computational storage unit by the command parser.

Statement 47. An embodiment of the disclosure includes the method according to statement 46, further comprising:
- receiving an argument of the tool at the command parser; and
- storing the argument of the tool at the file by the command parser.

Statement 48. An embodiment of the disclosure includes an apparatus for performing the method of any of statements 22-47.

Statement 49. An embodiment of the disclosure includes an article, comprising a non-transitory storage medium, the non-transitory storage medium having stored thereon instructions that, when executed by a machine, result in:
- receiving a command to start a tool on a computational storage unit;
- starting the tool on the computational storage unit;
- identifying a file in a memory of the computational storage unit; and
- establishing a pipe between the file and an input of the tool on the computational storage unit.

Statement 50. An embodiment of the disclosure includes the article according to statement 49, wherein receiving the command to start the tool on the computational storage unit receiving the command from a processor to start the tool on the computational storage unit Statement 51. An embodiment of the disclosure includes the article according to statement 49, the non-transitory storage medium having stored thereon further instructions that, when executed by the machine, result in:
- receiving an argument of the tool; and
- storing the argument of the tool at the file.

Statement 52. An embodiment of the disclosure includes the article according to statement 51, wherein receiving the argument of the tool receiving the argument of the tool from a processor.

Statement 53. An embodiment of the disclosure includes the article according to statement 51, wherein storing the argument of the tool at the file includes triggering the tool to retrieve the argument from the pipe.

Statement 54. An embodiment of the disclosure includes the article according to statement 51, wherein:
- receiving the argument of the tool includes receiving the argument of the tool by a controller of a storage device; and
- storing the argument of the tool at the file includes storing the argument of the tool at the file by the controller of the storage device.

Statement 55. An embodiment of the disclosure includes the article according to statement 49, wherein a processor may interact with the tool.

Statement 56. An embodiment of the disclosure includes the article according to statement 55, wherein the processor may interact with the tool in real time.

Statement 57. An embodiment of the disclosure includes the article according to statement 55, wherein the processor may interact with the tool in near real time.

Statement 58. An embodiment of the disclosure includes the article according to statement 49, the non-transitory storage medium having stored thereon further instructions that, when executed by the machine, result in routing an output of the tool to a log file.

Statement 59. An embodiment of the disclosure includes the article according to statement 49, the non-transitory storage medium having stored thereon further instructions that, when executed by the machine, result in:
- monitoring the log file by a processor for the output; and
- processing the output by the processor.

Statement 60. An embodiment of the disclosure includes the article according to statement 49, the non-transitory storage medium having stored thereon further instructions that, when executed by the machine, result in returning an output of the tool as a result of the command.

Statement 61. An embodiment of the disclosure includes the article according to statement 60, the non-transitory storage medium having stored thereon further instructions that, when executed by the machine, result in:
- receiving the result of the command by a processor; and
- processing the output by the processor.

Statement 62. An embodiment of the disclosure includes the article according to statement 49, wherein establishing the pipe between the file and the input of the tool on the computational storage unit includes using a virtual interface to establish the pipe between the file and the input of the tool.

Statement 63. An embodiment of the disclosure includes the article according to statement 62, wherein using the virtual interface to establish the pipe between the file and the input of the tool includes exposing a kernel object to a user space as a trigger.

Statement 64. An embodiment of the disclosure includes the article according to statement 62, wherein exposing the kernel object to the user space as the trigger includes:
- exposing a first bucket for an identifier of the tool; and
- exposing a second bucket for an argument of the tool.

Statement 65. An embodiment of the disclosure includes the article according to statement 64, wherein the second bucket includes the file.

Statement 66. An embodiment of the disclosure includes the article according to statement 64, the non-transitory storage medium having stored thereon further instructions that, when executed by the machine, result in:
- receiving the argument of the tool; and
- storing the argument of the tool in the second bucket.

Statement 67. An embodiment of the disclosure includes the article according to statement 66, wherein receiving the argument of the tool includes receiving the argument of the tool from a processor.

Statement 68. An embodiment of the disclosure includes the article according to statement 49, wherein the command includes a Non-Volatile Memory Express (NVMe) command.

Statement 69. An embodiment of the disclosure includes the article according to statement 49, wherein the command includes a debugging command.

Statement 70. An embodiment of the disclosure includes the article according to statement 49, the non-transitory storage medium having stored thereon further instructions that, when executed by the machine, result in:
- receiving a second command to start a second tool on the computational storage unit;
- starting the second tool on the computational storage unit;
- identifying a second file in the memory of the computational storage unit; and establishing a second pipe between the second file and a second input of the second tool on the computational storage unit.

Statement 71. An embodiment of the disclosure includes the article according to statement 70, wherein receiving the second command to start the second tool on the computational storage unit includes receiving the second command from a processor to start the second tool on the computational storage unit.

Statement 72. An embodiment of the disclosure includes the article according to statement 49, wherein:
receiving the command to start the tool on the computational storage unit includes receiving the command to start the tool on the computational storage unit at a controller of a storage device; and
starting the tool on the computational storage unit includes starting the tool on the computational storage unit by the controller of the storage device.

Statement 73. An embodiment of the disclosure includes the article according to statement 49, wherein:
receiving the command to start the tool on the computational storage unit includes receiving the command to start the tool on the computational storage unit at a command parser; and
starting the tool on the computational storage unit includes starting the tool on the computational storage unit by the command parser.

Statement 74. An embodiment of the disclosure includes the article according to statement 73, the non-transitory storage medium having stored thereon further instructions that, when executed by the machine, result in:
receiving an argument of the tool at the command parser; and
storing the argument of the tool at the file by the command parser.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:
a computational storage unit, the computational storage unit including a memory and a tool;
a command parser to receive a first command from a processor and to start the tool on the computational storage unit; and
a named pipe between a file in the memory and an input of the tool, wherein the named pipe provides a first data as a first input to the tool based at least on the first command and a second data as a second input to the tool based on a second command received from the processor.

2. The system according to claim 1, wherein the command parser is configured to receive the second command from the processor including an argument and to store the argument at the file.

3. The system according to claim 2, wherein the tool is triggered to retrieve the argument from the named pipe based at least in part on the argument being stored at the file.

4. The system according to claim 1, wherein the tool is configured to store an output of the tool in a log file.

5. The system according to claim 4, wherein the processor is configured to monitor the log file for the output and to process the output based at least in part on monitoring the log file for the output.

6. The system according to claim 1, wherein:
the computational storage unit is configured to return an output of the tool to the processor as a result of the second command received from the processor; and
the processor is configured to process the output.

7. The system according to claim 1, further comprising a virtual interface to the computational storage unit.

8. The system according to claim 7, wherein the virtual interface is configured to establish the named pipe between the file and the input of the tool.

9. The system according to claim 8, wherein the virtual interface includes:
a first bucket for an identifier of the tool; and
a second bucket for an argument of the tool.

10. The system according to claim 9, wherein the second bucket includes the file.

11. A method, comprising:
receiving a first command from a processor to start a tool on a computational storage unit;
starting the tool on the computational storage unit;
identifying a file in a memory of the computational storage unit; and
establishing a named pipe between the file and an input of the tool on the computational storage unit,
wherein the named pipe provides a first data as a first input to the tool based at least on the first command and a second data as a second input to the tool based on a second command received from the processor.

12. The method according to claim 11, further comprising:
receiving an argument of the tool from the processor; and
storing the argument of the tool at the file.

13. The method according to claim 12, wherein storing the argument of the tool at the file includes triggering the tool to retrieve the argument from the named pipe.

14. The method according to claim 11, further comprising storing an output of the tool to a log file by the tool.

15. The method according to claim 11, further comprising returning an output of the tool to the processor as a result of the first command.

16. The method according to claim 11, wherein establishing the named pipe between the file and the input of the tool on the computational storage unit includes using a virtual interface to establish the named pipe between the file and the input of the tool.

17. The method according to claim 16, wherein using the virtual interface to establish the named pipe between the file and the input of the tool includes:
exposing a first bucket for an identifier of the tool; and
exposing a second bucket for an argument of the tool.

18. An article, comprising a non-transitory storage medium, the non-transitory storage medium having stored thereon instructions that, when executed by a machine, result in:
receiving a command from a processor to start a tool on a computational storage unit;
starting the tool on the computational storage unit;
identifying a file in a memory of the computational storage unit; and
establishing a named pipe between the file and an input of the tool on the computational storage unit,
wherein the named pipe provides a first data as a first input to the tool based at least on the command and a second data as a second input to the tool based on a second command received from the processor.

19. The article according to claim 18, the non-transitory storage medium having stored thereon further instructions that, when executed by the machine, result in:
receiving an argument of the tool from the processor; and storing the argument of the tool at the file.

20. The article according to claim 18, the non-transitory storage medium having stored thereon further instructions that, when executed by the machine, result in routing storing an output of the tool to a log file by the tool.

\* \* \* \* \*